(12) United States Patent
Kim et al.

(10) Patent No.: US 11,387,489 B2
(45) Date of Patent: Jul. 12, 2022

(54) POLYMER ELECTROLYTE AND PREPARATION METHOD THEREFOR

(71) Applicants: LG CHEM, LTD., Seoul (KR); POSTECH ACADEMY-INDUSTRY FOUNDATION, Pohang-si (KR)

(72) Inventors: Daeil Kim, Daejeon (KR); Moon Jeong Park, Pohang-si (KR); Jonghyun Chae, Daejeon (KR); Yeonju Lee, Daejeon (KR); Lucia Kim, Daejeon (KR); Ha Young Jung, Cheonan-si (KR); Gyuha Jo, Busan (KR)

(73) Assignees: LG ENERGY SOLUTION, LTD., Seoul (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 315 days.

(21) Appl. No.: 16/487,725

(22) PCT Filed: Sep. 21, 2018

(86) PCT No.: PCT/KR2018/011231
§ 371 (c)(1),
(2) Date: Aug. 21, 2019

(87) PCT Pub. No.: WO2019/059705
PCT Pub. Date: Mar. 28, 2019

(65) Prior Publication Data
US 2019/0386340 A1    Dec. 19, 2019

(30) Foreign Application Priority Data

Sep. 21, 2017  (KR) .................. 10-2017-0121709
Aug. 10, 2018  (KR) .................. 10-2018-0093721

(51) Int. Cl.
*H01M 10/0565*    (2010.01)
*C08G 65/333*    (2006.01)
(Continued)

(52) U.S. Cl.
CPC ...... *H01M 10/0565* (2013.01); *C08G 65/333* (2013.01); *C08G 65/3355* (2013.01); *H01M 10/052* (2013.01); *H01M 2300/0082* (2013.01)

(58) Field of Classification Search
None
See application file for complete search history.

(56) References Cited

U.S. PATENT DOCUMENTS 5,102,751 A    4/1992  Narang et al.
5,202,009 A    4/1993  Andrieu et al.
(Continued)

FOREIGN PATENT DOCUMENTS

| CN | 102443163 A | 5/2012 |
|---|---|---|
| CN | 103872377 A | 6/2014 |

(Continued)

OTHER PUBLICATIONS

Brunet et al., "Engineering of Microcrystaline Solid-State Networks Using Cross-Linked γ-Zirconium Phosphate/Hypophosphite with Nonrigid Polyethylenoxadiphosphonates. Easy Access to Porously Dynamic Solids with Polar/Nonpolar Pores", Chem. Mater. 2005, vol. 17, No. 6, pp. 1424-1433.
(Continued)

*Primary Examiner* — Haixia Zhang
(74) *Attorney, Agent, or Firm* — Birch, Stewart, Kolasch & Birch, LLP

(57) ABSTRACT

A polymer electrolyte including a poly(ethylene oxide) (PEO) containing polymer; and a lithium salt, wherein a terminal of the poly(ethylene oxide) containing polymer is substituted with a sulfur compound functional group, a
(Continued)

nitrogen compound functional group or a phosphorus compound functional group, and a method for preparing the same and a battery containing the same.

11 Claims, 12 Drawing Sheets

(51) Int. Cl.
*C08G 65/335* (2006.01)
*H01M 10/052* (2010.01)

(56) References Cited

U.S. PATENT DOCUMENTS

| | | | |
|---|---|---|---|
| 5,496,662 | A | 3/1996 | Andrieu et al. |
| 5,643,490 | A | 7/1997 | Takahashi et al. |
| 2008/0038642 | A1 | 2/2008 | Kwak et al. |
| 2009/0148777 | A1 | 6/2009 | Song et al. |
| 2010/0003604 | A1 | 1/2010 | Kang et al. |
| 2011/0206994 | A1 | 8/2011 | Balsara et al. |
| 2012/0009715 | A1 | 1/2012 | Sim et al. |
| 2012/0083577 | A1 | 4/2012 | Pratt |
| 2015/0155594 | A1* | 6/2015 | Lee .................. H01M 4/62 429/310 |
| 2016/0087306 | A1 | 3/2016 | Lee et al. |
| 2016/0308245 | A1 | 10/2016 | Xu et al. |
| 2017/0158817 | A1 | 6/2017 | Ogiwara et al. |
| 2017/0187063 | A1 | 6/2017 | Pistorino et al. |

FOREIGN PATENT DOCUMENTS

| | | |
|---|---|---|
| EP | 0 650 208 A1 | 4/1995 |
| JP | 3-188157 A | 8/1991 |
| JP | 6-223842 A | 8/1994 |
| JP | 2008-130529 A | 6/2008 |
| JP | 2008-277218 A | 11/2008 |
| JP | 2009-544794 A | 12/2009 |
| JP | 2011-506629 A | 3/2011 |
| JP | 2011-181352 A | 9/2011 |
| JP | 2011-243568 A | 12/2011 |
| JP | 2015-2153 A | 1/2015 |
| JP | 2018-170266 A | 11/2018 |
| KR | 10-2001-0016917 A | 3/2001 |
| KR | 10-2005-0087263 A | 8/2005 |
| KR | 10-2015-0041711 A | 4/2015 |
| KR | 10-1639839 B1 | 7/2016 |
| KR | 10-2017-0029527 A | 3/2017 |
| KR | 10-2018-0102856 A | 9/2018 |
| WO | WO 2005/060444 A2 | 7/2005 |
| WO | WO 2005/081646 A2 | 9/2005 |
| WO | WO 2011/132717 A1 | 10/2011 |
| WO | WO 2014/062898 A1 | 4/2014 |

OTHER PUBLICATIONS

Dirks et al., "Monitoring Protein-Polymer Conjugation by a Fluorogenic Cu(I)-Catalyzed Azide-Alkyne 1,3-Dipolar Cycloaddition", Bioconjugate Chem. 2009, vol. 20, No. 6, pp. 1129-1138.
Hu et al., "Flexible Organic-Inorganic Hybrid Solid Electrolytes Formed via Thiol-Acrylate Photopolymerization", Macromolecules, 2017, vol. 50, No. 5, pp. 1970-1980.
International Search Report (PCT/ISA/210) issued in PCT/KR2018/011231, dated Mar. 22, 2019.
Ito et al., "High lithium ionic conductivity of poly(ethylene oxide)s having sulfonate groups on their chain ends", J. Mater. Chem., 1997, vol. 7, No. 8, pp. 1357-1362.
Jo et al., "Simple Route for Tuning the Morphology and Conductivity of Polymer Electrolytes: One End Functional Group is Enough", ACS Macro Letters 2013, vol. 2, pp. 990-995.
Jung et al., "Modulating Ion Transport and Self-Assembly of Polymer Electrolytes via End-Group Chemistry", Macromolecules 2017, vol. 50, pp. 3224-3233.
Zhang et al., "Determination of polyethylene glycol end group functionalities by combination of selective reactions and characterization by matrix assisted laser desorption/ionization time-of-flight mass spectrometry", Analytica Chimica Acta 816 (2014), pp. 28-40.
Zhou et al., "Facile and efficient bromination of hydroxyl-containing polymers to synthesize well-defined brominated polymers", Polymer Chemistry, 2017, vol. 8, pp. 2189-2196.
Database WPI, Week 201173, Thomson Scientific, London, GB; AN 2011-N51648, XP002797003, 3 pages, 2011.
Extended European Search Report for European Application No. 18859540.9, dated Jan. 29, 2020.
Xue et al., "Poly(ethylene oxide)-based electrolytes for lithium-ion batteries," Journal of Materials Chemistry A, vol. 3, 2015, pp. 19218-19253.
Chen et al., "Confined Crystallization and Melting Behavior of Poly(ethylene oxide) Capped with n-Octadecyl Groups—The Effect of Tethering Density," Acta Polymerica Sinica, No. 10, 2013, pp. 1341-1349, 9 pages total, with an English abstract.
Tang et al., "Poly(ethylene oxide) Polymer Electrolyte," Polymer Materials Science and Engineering, vol. 19, No. 2, 2003, pp. 48-51 and 56, 5 pages total, with an English abstract.

* cited by examiner

[Figure 1]
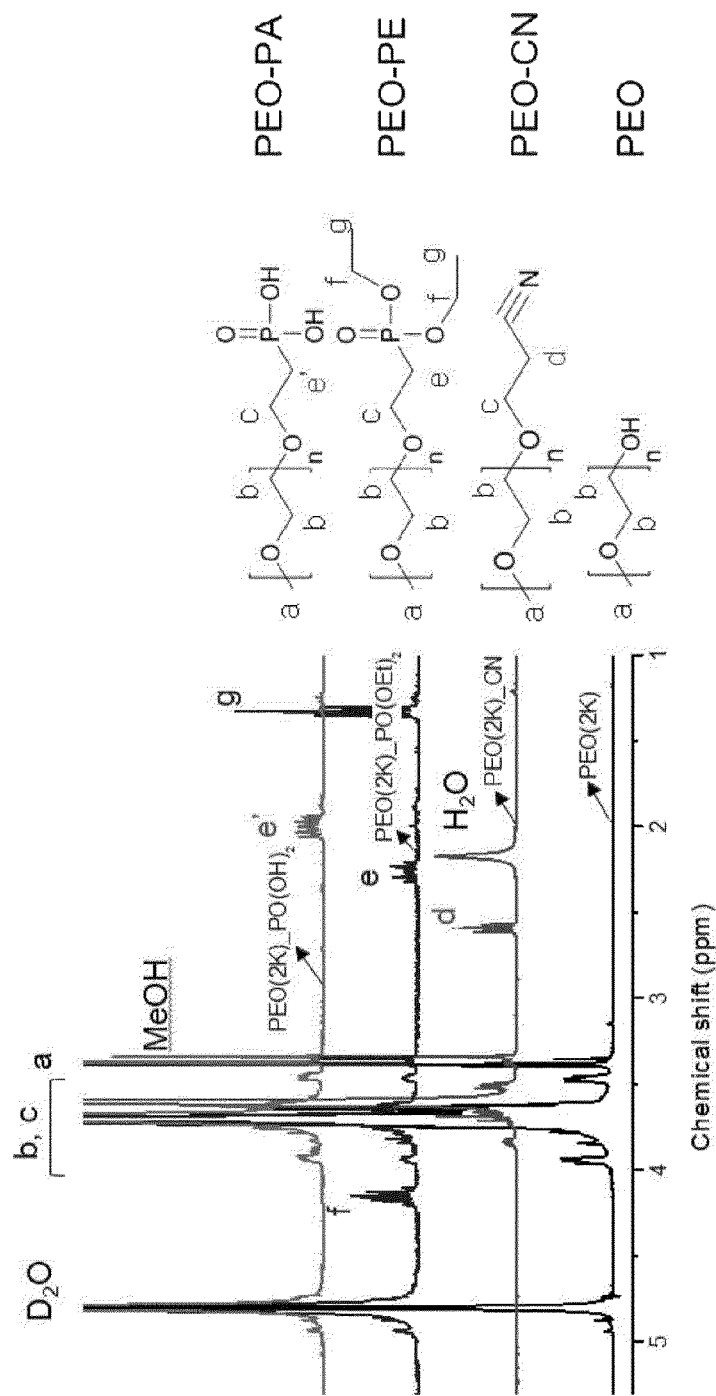

【Figure 2】
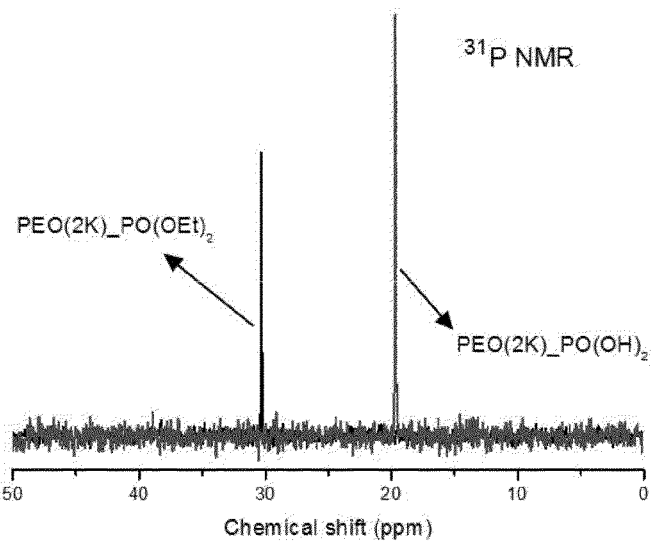
【Figure 3】
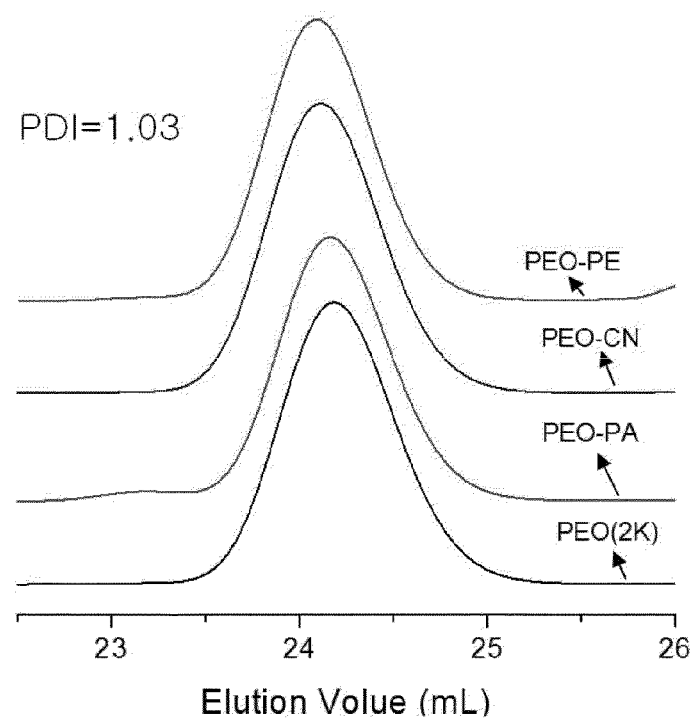

【Figure 4】
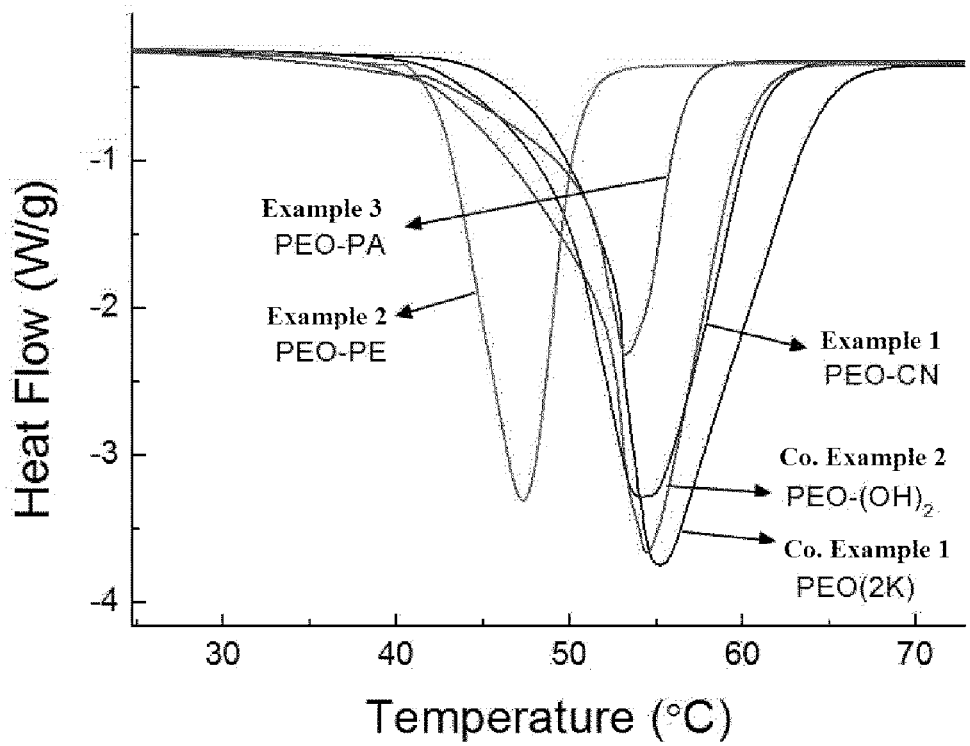
【Figure 5】
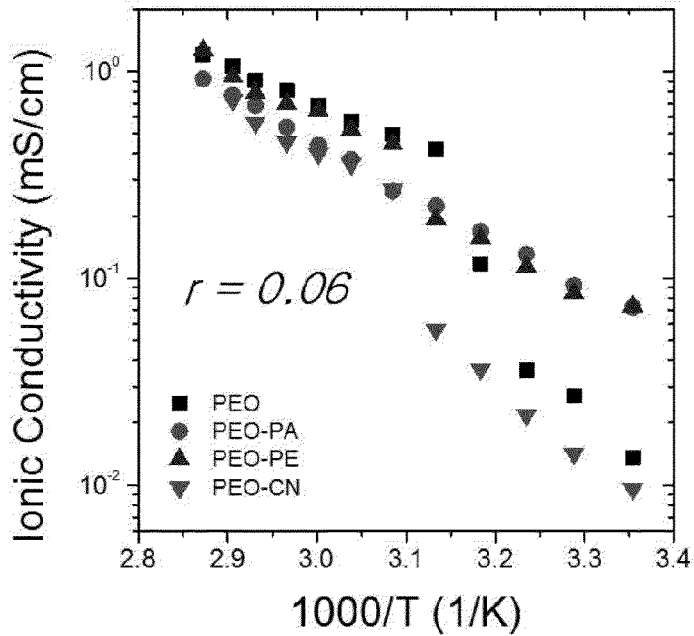

【Figure 6】
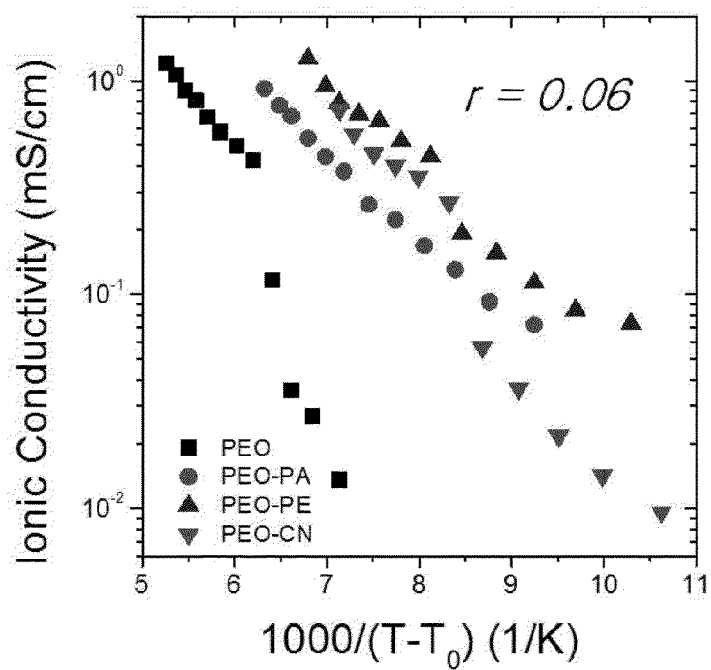
【Figure 7】
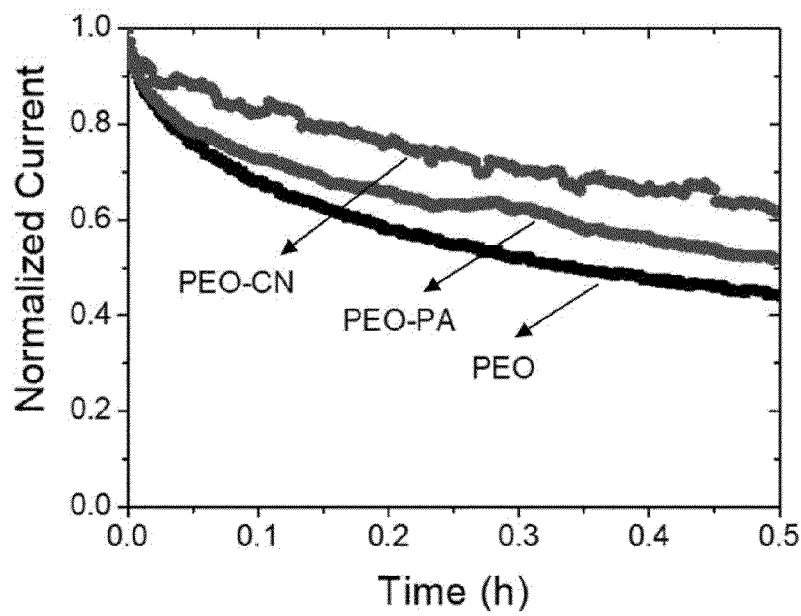

【Figure 8】
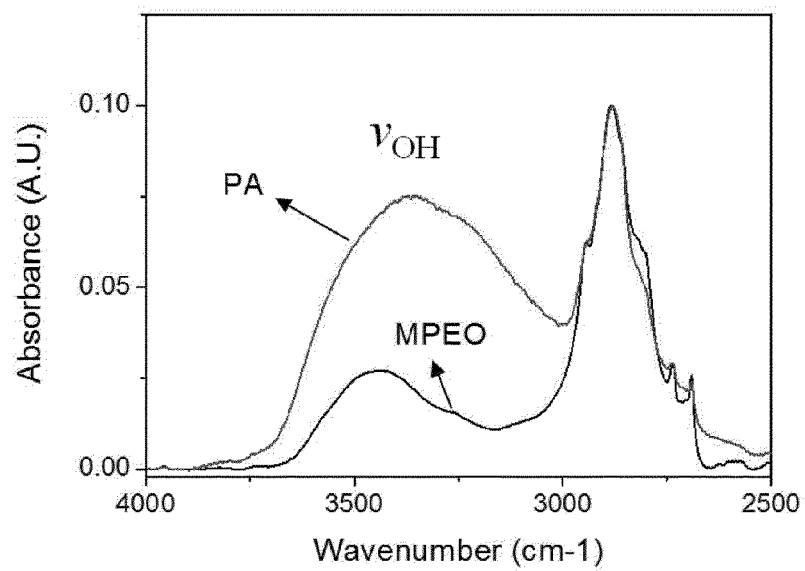
【Figure 9】
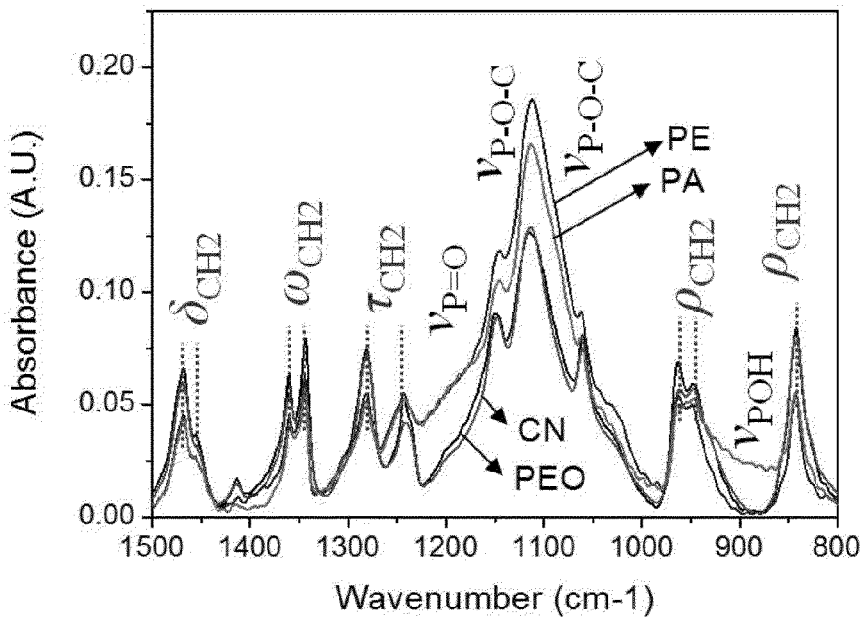

[Figure 10]
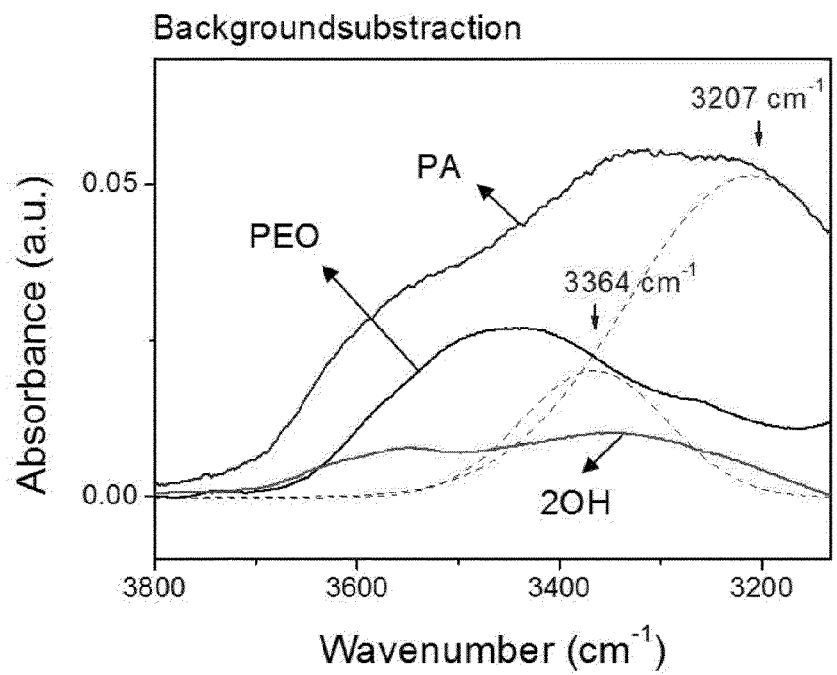
[Figure 11]
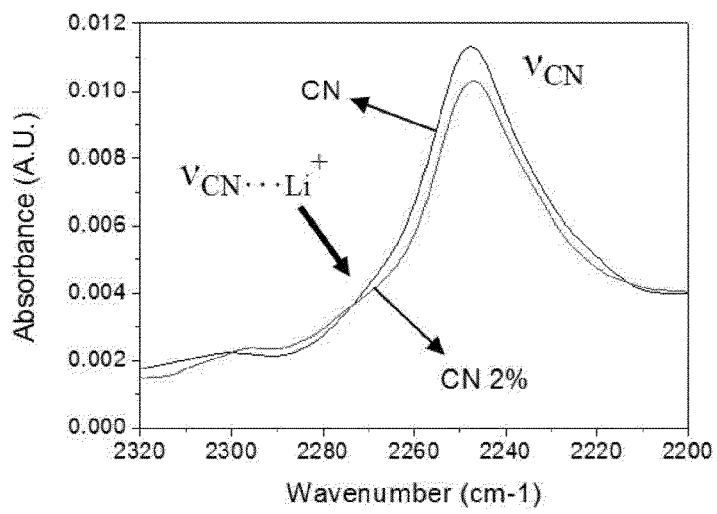

【Figure 12】
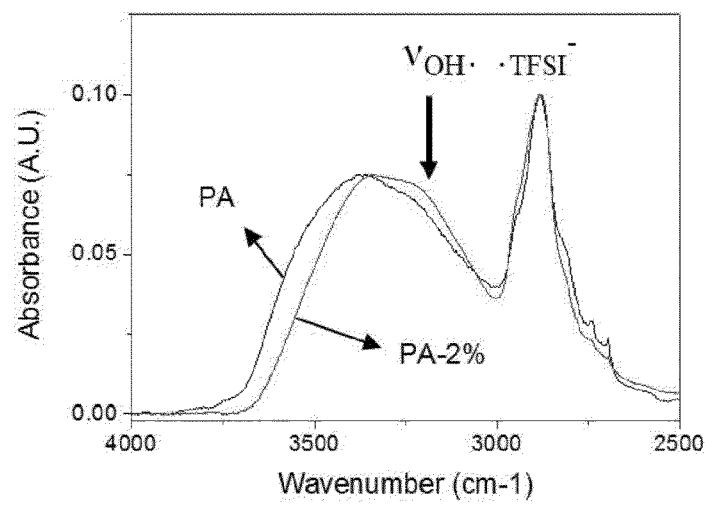
【Figure 13】
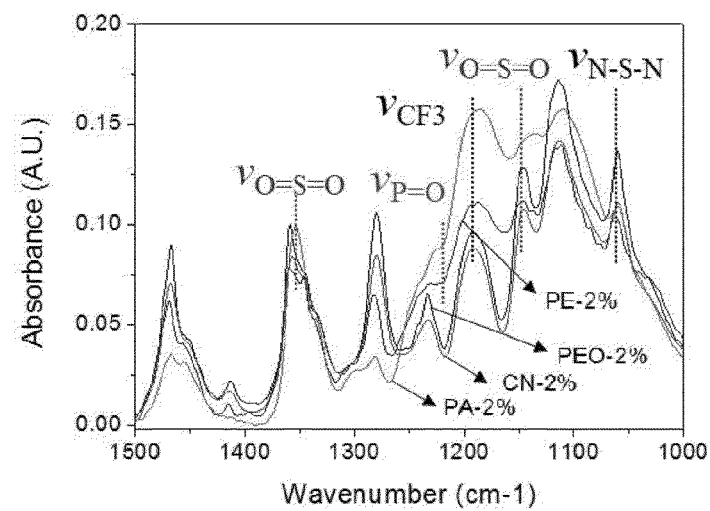

【Figure 14】
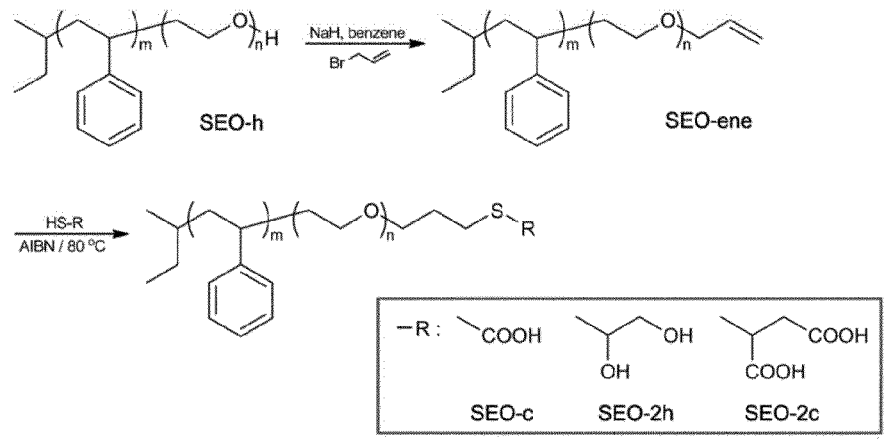
【Figure 15】
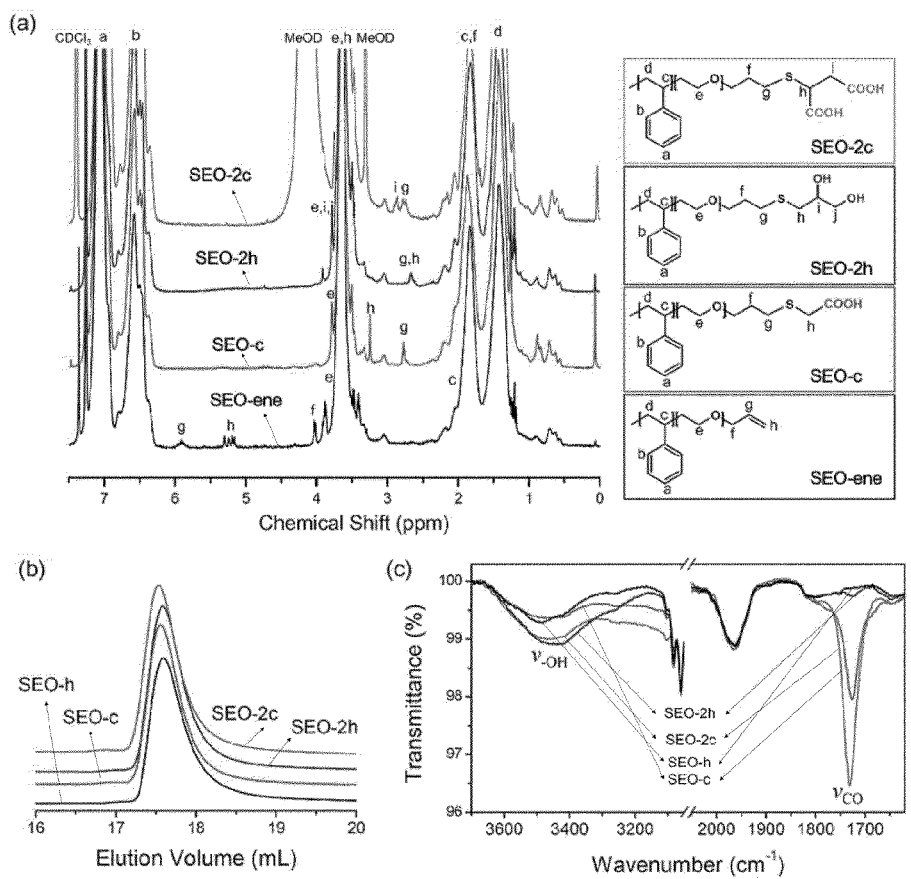

[Figure 16]
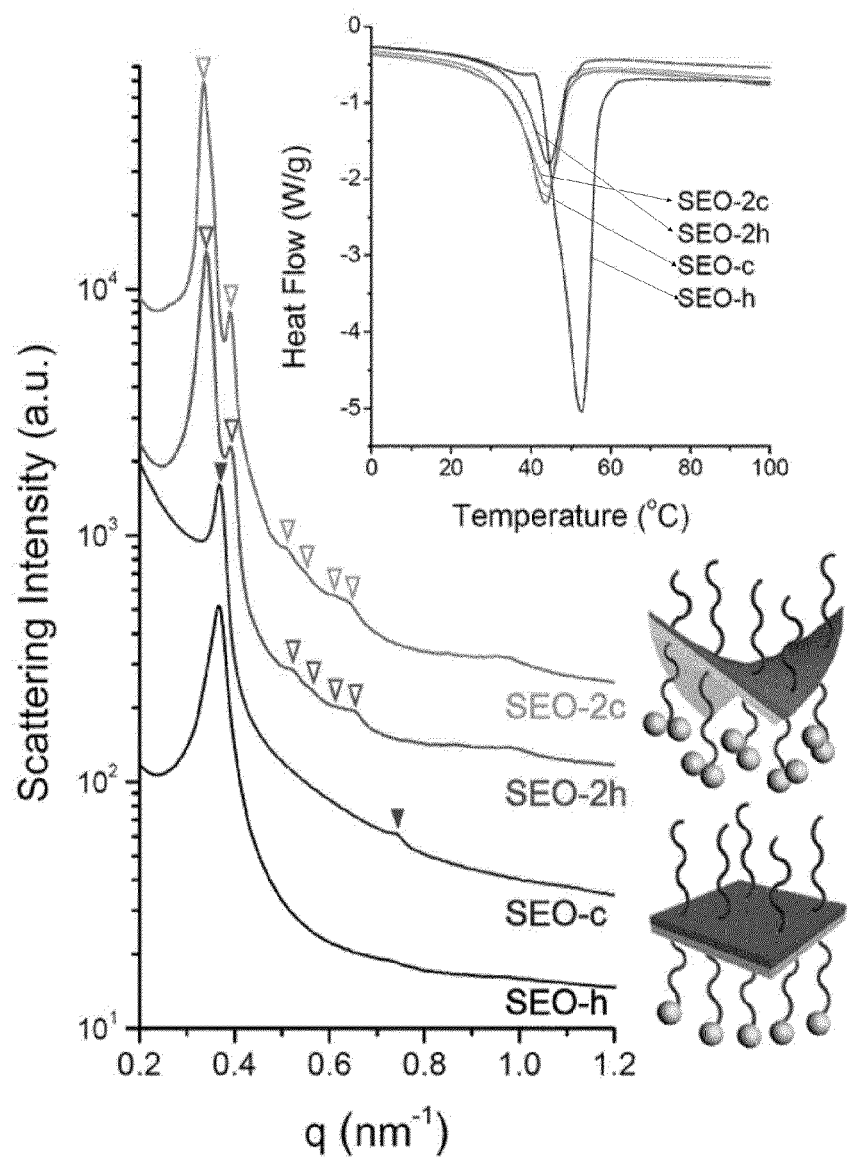

【Figure 17】
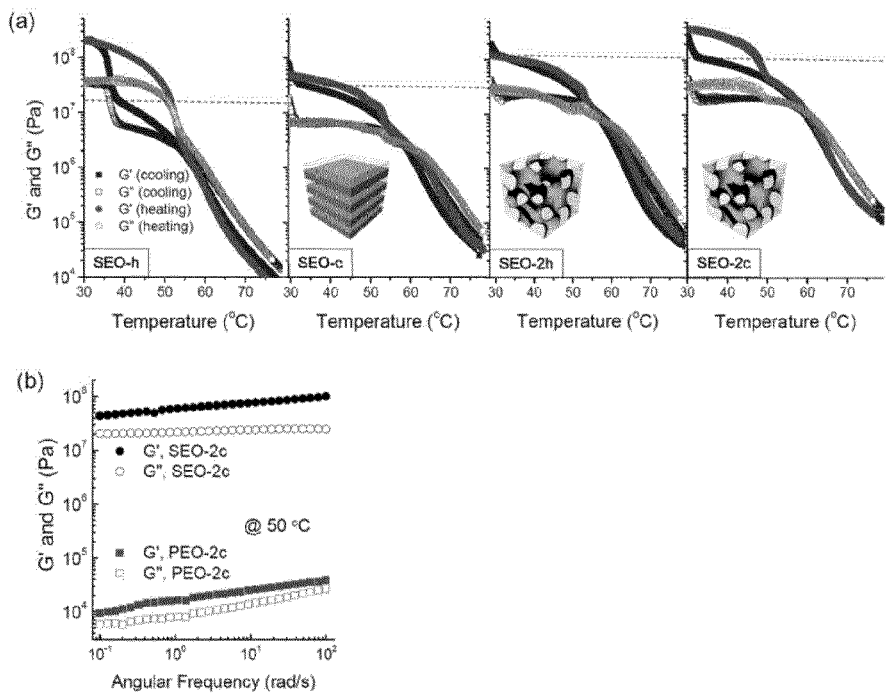
【Figure 18】
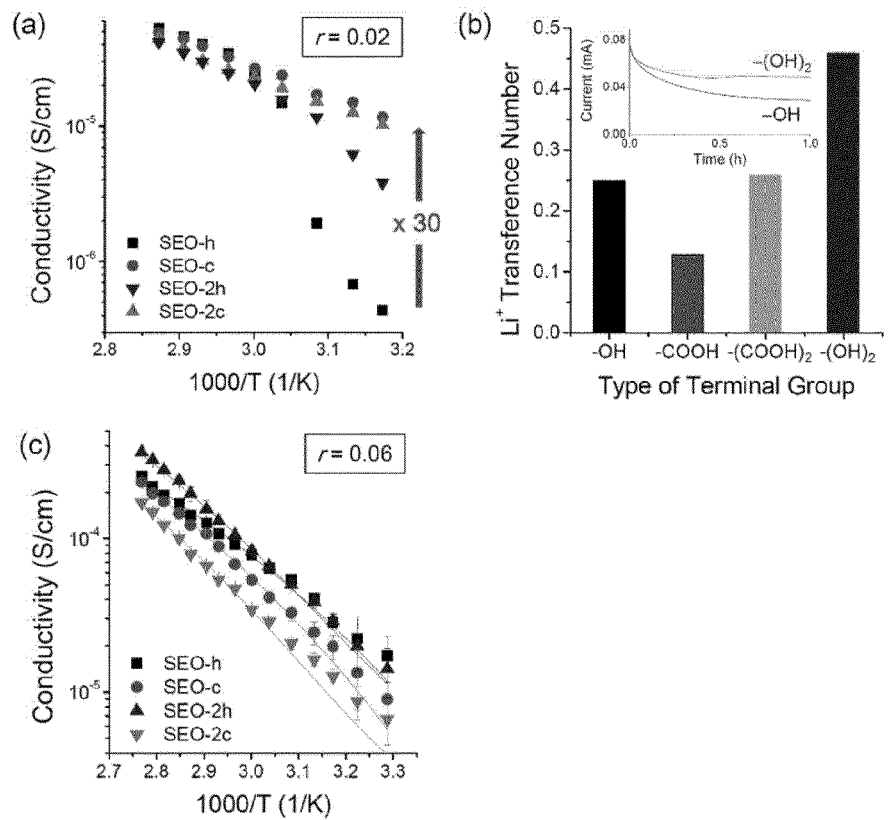

[Figure 19]
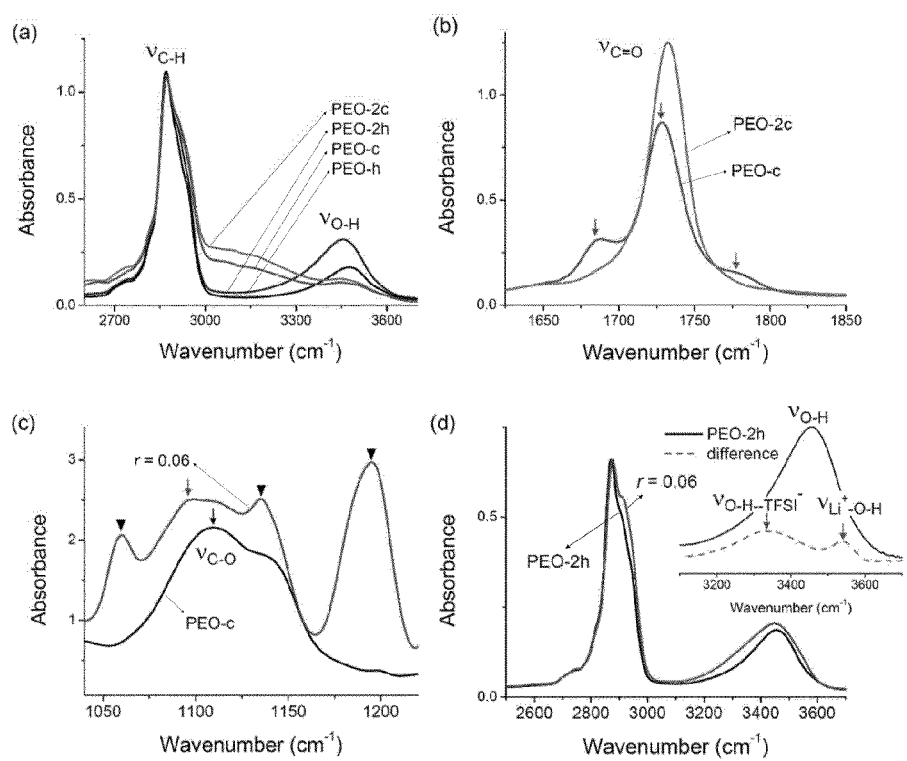

【Figure 20】
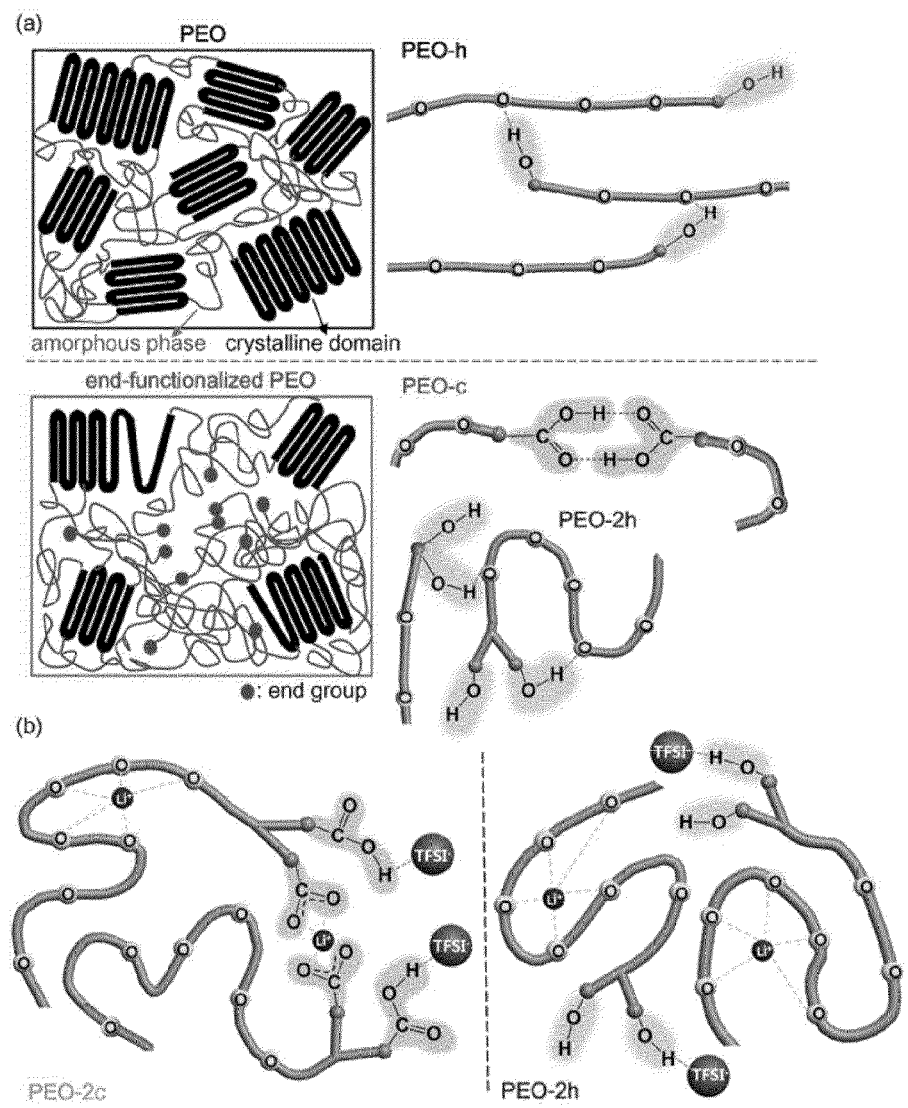

POLYMER ELECTROLYTE AND PREPARATION METHOD THEREFOR

TECHNICAL FIELD

The present application claims the benefit of Korean Patent Application No. 10-2017-0121709 filed on Sep. 21, 2017 and Korean Patent Application No. 10-2018-0093721 filed on Aug. 10, 2018, all the contents of which are incorporated herein by reference.

The present invention relates to a polymer electrolyte and a method of preparing the same, and more particularly, to a polymer electrolyte having improved transference number of lithium cations and a method of preparing the same.

BACKGROUND ART

As the application field of secondary battery, which can be charged/discharged, from portable devices such as mobile phones, notebooks, and camcorders to electric vehicles is expanding day by day, secondary batteries are being actively developed. In addition, the research and development of battery design to improve capacity density and specific energy in the development of secondary battery are also under way.

Generally, it is known that the safety of the battery is increased in the order of liquid electrolyte <gel polymer electrolyte <solid electrolyte, while the battery performance is reduced.

A liquid state electrolyte, in particular, an ion conductive organic liquid electrolyte in which a salt is dissolved in a non-aqueous organic solvent has been mainly used as an electrolyte for an electrochemical device such as a battery using a conventional electrochemical reaction and an electric double layer capacitor. However, if such an electrolyte in a liquid state is used, there is a great possibility that the electrode material is degraded and the organic solvent is volatilized and also there is a problem in safety such as combustion due to ambient temperature and temperature rise of the battery itself.

In particular, the electrolyte used in the lithium secondary battery is in a liquid state and has the risk of flammability in high temperature environments, which can be a significant burden on the application to electric vehicles. In addition, since the organic electrolyte solution whose solvent is flammable is used, problems of ignition and burning in addition to leakage are always accompanied. For this reason, it has been studied to use an electrolyte having a flame retarding ionic liquid or gel phase, or an electrolyte having a polymer phase as an electrolyte solution. Accordingly, replacing a liquid state lithium electrolyte with a solid electrolyte can solve this problem. Therefore, various solid electrolytes have been researched and developed up to now.

The solid electrolyte is mainly made of flame retarding materials and thus have high stability and is stable at high temperature because it is composed of nonvolatile materials. In addition, since a solid electrolyte serves as a separator, a conventional separator is not necessary and there is a possibility of a thin film process The most ideal form is an all-solid state form that uses inorganic solids even in the electrolyte, from which a secondary battery with excellent safety as well as excellent stability or reliability is obtained. In order to obtain a large capacity (energy density), it is also possible to adopt the form of a laminated structure. In addition, it is unnecessary to de-solvate the solvated lithium as in the conventional electrolytic solution, and since only lithium ions need to move through the ion conductor solid electrolyte and thus unnecessary side reactions do not occur, the cycle life can be greatly extended.

With regard to the ion conductivity of the solid electrolyte, which is the biggest problem to be solved in realizing an all-solid state secondary battery, previously, such conductivity has not been far below that of the organic electrolyte solution, but recently, a variety of techniques for improving ion conductivity have been reported, and studies on the practical use of an all-solid state secondary battery using the same have been continued.

The composite electrolyte of poly(ethylene oxide) (PEO) and lithium salt, which is one of the electrolytes used in such lithium ion batteries, has the advantage of having higher stability than the conventional liquid electrolyte.

However, PEO used in this electrolyte is a polymer with high crystallinity and thus when crystallized below the melting point of the polymer (about 50° C.), has a problem of extremely low ion conductivity. In the past, the polymer having a liquid state at room temperature by extremely decreasing the molecular weight of PEO was frequently used, but it is hard to say that this is a fundamental study that reduces the crystallization characteristics of PEO.

(Non-Patent Literature 1) Ito, K.; Nishina, N.; Ohno, H. J. Mater. Chem. 1997, 7, 1357-1362.
(Non-Patent Literature 2) Jo, G.; Anh, H.; Park, M. J. ACS Macro Lett. 2013, 2, 990-995.

DISCLOSURE

Technical Problem

As described above, if PEO is used in electrolyte, when crystallized at about 50° C. or lower, there arises a problem that the ion conductivity becomes extremely low due to the low melting point of the polymer. Accordingly, as a result of various studies, the inventors of the present invention have found a way to solve the problem by synthesizing a new polymer capable of reducing the intrinsic crystallinity of the PEO chain, and thus completed the present invention.

Therefore, it is an object of the present invention to provide an electrolyte for a lithium battery through the new functional group introduced polymer wherein the electrolyte is a PEO-based polymer electrolyte containing lithium salt, which has excellent room temperature ion conductivity at room temperature and has also been improved in transference number of lithium cations.

Technical Solution

In order to accomplish the above object, the present invention provides a polymer electrolyte comprising poly(ethylene oxide) (PEO)-based polymer and lithium salt wherein the terminal of the poly(ethylene oxide) polymer is substituted with a sulfur compound functional group, a nitrogen compound functional group, or a phosphorus compound functional group.

In addition, the present invention provides a method of preparing a polymer electrolyte comprising the steps of (a) adding a sulfur compound, a nitrogen compound or a phosphorus compound to the poly(ethylene oxide) (PEO)-based polymer to modify the terminal of the poly(ethylene oxide)-based polymer; and (b) adding a lithium salt.

In addition, the present invention provides an all-solid state battery comprising a positive electrode, a negative electrode and a solid polymer electrolyte interposed therebetween, wherein the solid polymer electrolyte is a polymer electrolyte including poly(ethylene oxide) (PEO)-based polymer and lithium salt and wherein the terminal of the poly(ethylene oxide) polymer is substituted with a nitrogen compound functional group or a phosphorus compound functional group.

Advantageous Effects

When the polymer electrolyte of the present invention is applied to an all-solid state battery, the crystallinity of the polymer can be reduced by synthesizing a polymer having various terminal functional groups introduced therein without changing the molecular weight of PEO. Therefore, the polymer electrolyte of the present invention can have excellent ion conductivity even at room temperature. In addition, by controlling the molecular attraction between the terminal functional group and the lithium salt, there is an effect where the transference number of lithium cations can be improved, thereby improving the discharge capacity and charging/discharging speed.

DESCRIPTION OF DRAWINGS

FIG. 1 is a graph showing the results of 1H NMR measurements of Examples 1 to 3 of the present invention and Comparative Example 1.

FIG. 2 is a graph showing the results of 31P NMR measurements of Examples 2 to 3 of the present invention.

FIG. 3 is a graph showing results of gel permeation chromatography (GPC) analysis of Examples 1 to 3 of the present invention and Comparative Example 1.

FIG. 4 is a graph showing the results of differential scanning calorimeter (DSC) analysis of Examples 1 to 3 of the present invention and Comparative Examples 1 and 2.

FIG. 5 is a graph showing the results of ionic conductivity analysis of Examples 1 to 3 of the present invention and Comparative Example 1.

FIG. 6 is a graph showing the normalized ionic conductivity of Examples 1 to 3 of the present invention and Comparative Example 1.

FIG. 7 is a graph showing the results of electrode polarization measurements of Examples 1 to 3 of the present invention and Comparative Example 1.

FIG. 8 is a graph showing the results of FT-IR measurements of Examples 1 to 3 of the present invention and Comparative Example 1.

FIG. 9 is a graph showing the results of FT-IR measurements of Examples 1 to 3 of the present invention and Comparative Example 1.

FIG. 10 is a graph showing the results of FT-IR measurements of Examples 1 to 3 of the present invention and Comparative Example 1.

FIG. 11 is a graph showing the results of FT-IR measurements of the polymer of Example 1 of the present invention, and the polymer electrolytes which is doped with LiTFSI.

FIG. 12 is a graph showing the results of FT-IR measurements of the polymer of Example 3 of the present invention, and the polymer electrolyte which is doped with LiTFSI.

FIG. 13 is a graph showing the results of FT-IR measurements of the polymers of Examples 1 to 3 of the present invention and Comparative Example 1, and the polymer electrolytes which are doped with LiTFSI.

FIG. 14 shows the synthetic route of end-functionalized PS-b-PEO block copolymers through thiol-ene click chemistry.

FIG. 15 shows (a) 1H NMR spectra of SEO-ene, SEO-c, SEO-2h and SEO-2c; (b) SEC traces and (c) FT-IR spectra of SEO-h, SEO-c, SEO-2h, and SEO-2c.

FIG. 16 is SAXS data of SEO-h, SEO-c, SEO-2h, and SEO-2c at 60° C. The filled inverse triangles represent bragg peaks q*, 2q* of SEO-c. Open inverted triangles represent Bragg peaks $\sqrt{6}_{q*}$, $\sqrt{8}_{q*}$, $\sqrt{14}_{q*}$, $\sqrt{16}_{q*}$, $\sqrt{20}_{q*}$, and $\sqrt{22}_{q*}$ of SEO-2h and SEO-2c. The interfacial changes by the terminal group are shown in the drawing. DSC data representing the degree of crystallization of SEO samples with terminal substitutions were inserted.

FIG. 17 shows (a) storage (G', filled symbol) and loss (G", open symbol) modulus. Experiments to cool (blue) to 0.1% strain at 0.5 rad/s and increase the temperature (red) were performed at a constant rate of 1° C./min. The plateau moduli of samples with terminal substitution are indicated by a dotted line. (b) G', G" of SEO-2c and PEO-2c measured at 50° C. depending on the frequency.

FIG. 18 is a graph showing ion conduction characteristics by doping lithium salt in the samples with the terminal group substitution.

FIG. 19 shows (a) the ion conduction characteristics of an SEO electrolyte membrane depending on the temperature, in which the terminal group doped with lithium salt was substituted at r=0.02, and (b) the lithium transference number measured by a polarization experiment at T=60 DEG C. and DV=0.1 V, and representative data observing the current flow was inserted. (c) ion conduction characteristics of SEO electrolyte membrane depending on the temperature, in which the terminal group doped with lithium salt was substituted at r=0.06. One fitted through the Vogel-Tammann-Fulcher (VTF) equation was indicated by solid lines. (d) Data doped and undoped with lithium salt of PEO-2h (r=0.06). The terminal group with hydrogen bond, dipolar interaction with TFSI-anion and lithium ion, respectively, was shown. Peaks ranging between 3700-2500 cm$^{-1}$ was magnified and inserted.

FIG. 20 is (a) a diagram showing the intra- and intermolecular interactions of PEO chain with the terminal group substitution. (b) is a diagram showing the interactions of PEO-2c and PEO-2h under a lithium salt. Hydrogen-bonding interactions between terminal groups and TFSI-anion and coordination of lithium ion with ether oxygen are shown. The dimer formation observed in PEO-2c is also shown.

BEST MODE

Hereinafter, the present invention will be described in detail with reference to the accompanying drawings so that those having ordinary skill in the art to which the present invention pertains can easily carry out the present invention. However, the present invention may be embodied in many different forms and should not be construed as limited to the embodiments set forth herein.

In the drawings, in order to clearly illustrate the present invention, parts that are not related to the description of the present invention are omitted, and similar reference numerals are used for similar parts throughout the specification. Also, the size and relative size of the components shown in the figures are independent of the actual scale and may be reduced or exaggerated for clarity of description.

Polymer Electrolyte

The present invention provides a polymer electrolyte comprising a poly(ethylene oxide) (PEO) containing polymer which is a novel polymer capable of reducing the crystallinity of the polymer by synthesizing the polymer having various terminal functional groups introduced therein without changing the molecular weight of PEO; and a lithium salt, wherein a terminal of the poly(ethylene oxide) containing polymer is substituted with a sulfur compound functional group, a nitrogen compound functional group, or a phosphorus compound functional group.

The polymer electrolyte of the present invention can enhance ion conduction characteristics by introducing a sulfur compound, a nitrogen compound or a phosphorus compound as a functional group into the terminal of poly(ethylene oxide) polymer and thus inducing various interactions between the functional group introduced into the polymer and the lithium salt.

Specifically, in the present invention, the nitrogen compound functional groups introduced into the terminal of the poly(ethylene oxide) containing polymer include nitrile, amine, pyridine, imidazole and the like, and the phosphorus compound functional group includes diethyl phosphonate, or phosphoric acid.

In the present invention, a specific example of a polymer in which a nitrogen compound or a phosphorus compound is introduced as a functional group at the terminal of the poly(ethylene oxide)containing polymer can be represented by any one of formulas 1 to 3 below:

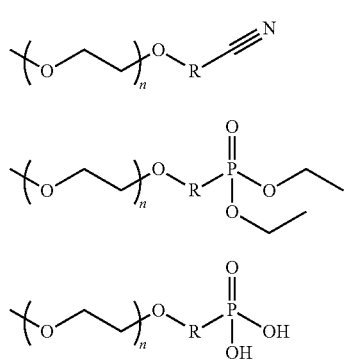

[Formula 1]

[Formula 2]

[Formula 3]

wherein n is a repeating unit of an integer of 10 to 120, and R is an alkyl chain having 1-4 carbon atoms.

As described above, the polymer electrolyte of the present invention can reduce the crystallinity of the polymer to about 30 to 80% compared to that of non-substituted poly(ethylene oxide) (PEO), by synthesizing the polymer having various terminal functional groups introduced therein without changing the molecular weight of poly(ethylene oxide) (PEO).

Specifically, in the present invention, the sulfur compound functional group introduced into the terminal of the poly(ethylene oxide) containing polymer may be one having the functional group represented by the following formula 4:

—S—R  [Formula 4]

wherein R is carboxyl group, diol group or dicarboxyl group having 1-4 carbon atoms. In addition, in formula 4, —R may be one or more selected from the functional groups represented by the following formulas (a) to (c):

(a)

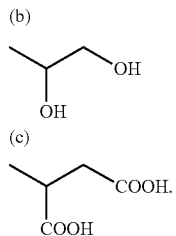

(b)

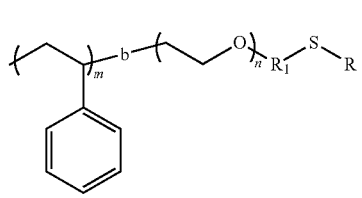

(c)

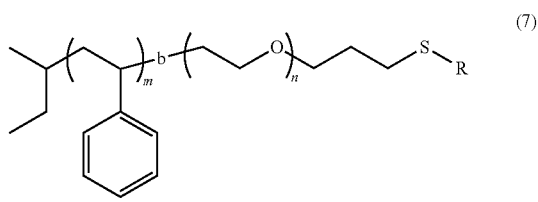

In the present invention, when the terminal of the poly(ethylene oxide) containing polymer is substituted with the sulfur compound functional group, the poly(ethylene oxide) containing polymer may be a block copolymer comprising a poly(ethylene oxide) block, wherein a terminal of the poly(ethylene oxide) block is substituted with the sulfur compound functional group. An embodiment may include such a poly(ethylene oxide) block and a hydrophobic block, for example, a polystyrene block.

In an embodiment of the present invention, the block copolymer may be represented by the following formula (6):

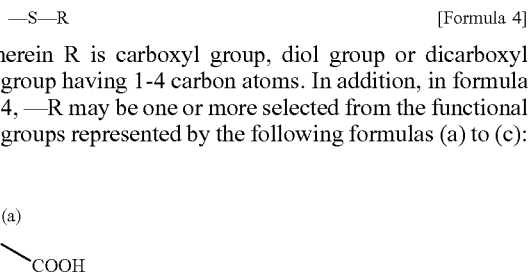

(6)

wherein R is carboxyl group, diol group, or dicarboxyl group having 1-4 carbon atoms, R1 is alkyl having 1 to 8 carbon atoms, b means a block copolymer, $0<n<200$, $0<m<100$, $1.5m<n<2.5m$, and the molecular weight of the block copolymer is 20 kg/mol or less, preferably 2 to 20 kg/mol, and the molecular weight of each block is 1 to 10 kg/mol.

In a preferred embodiment of the present invention, the block copolymer may be represented by the following formula (7), and the functional group —R may be expressed by the formula (5):

(7)

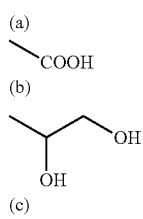

(5)

(a)

COOH (b)

OH
OH (c)

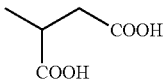

wherein b means a block copolymer,

0<n<200, 0<m<100, 1.5m<n<2.5m, and the molecular weight of the block copolymer is 2 to 20 kg/mol.

In the present invention, the block copolymer may be doped with a metal salt, preferably lithium salt.

In the present invention, the block copolymer may have a gyroid, lamellar, or amorphous structure.

In addition, the polymer electrolyte of the present invention can be used as a solid electrolyte for an all-solid state battery.

The solid electrolyte is mainly made of flame retarding materials and is stable at high temperature because it is made of nonvolatile material with high stability. In addition, since a solid electrolyte acts as a separator, a conventional separator is not necessary and a thin film process is possible.

The most ideal form is an all-solid state form that uses inorganic solids in the electrolyte, from which a secondary battery having excellent stability and reliability as well as excellent safety can be obtained. In order to obtain a large capacity (energy density), it is also possible to adopt the form of a laminated structure. In addition, it is unnecessary to de-solvate the solvated lithium as in the conventional electrolytic solution, and since only lithium ions need to move through the ion conductor solid electrolyte and thus unnecessary side reactions do not occur, the cycle life can be greatly extended.

In addition, the polymer electrolyte of the present invention is preferable for application to an all-solid state ion battery because its ion conductivity is improved as described later.

In addition, the present invention intends to improve ion conductivity and lithium cation transference characteristics by introducing a lithium salt into the polymer to prepare a composite electrolyte as described above.

To this end, the present invention dope the poly(ethylene oxide) polymer with a lithium salt.

The lithium salt is not particularly limited, but preferably, may be at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, chloroborane lithium, lithium lower aliphatic carboxylate, lithium 4-phenylborate, imide, and bis(trifluoromethane sulfonyl)imide (LiTFSI).

Since the polymer electrolyte of the present invention can reduce the crystallinity of the polymer by synthesizing the polymer having various terminal functional groups introduced therein without changing the molecular weight of poly(ethylene oxide) (PEO), the molecular weight of the poly(ethylene oxide) containing polymer can be 1 to 20 kg/mol.

Also, in the polymer electrolyte of the present invention, [Li$^+$]/[EO] value, which is a ratio of ethylene oxide [EO] in the poly(ethylene oxide) containing polymer and [Li$^+$] of the lithium salt, may be between 0.02 and 0.08 in order to ensure practical performance of the lithium battery. When the concentration of [EO] in the polymer and [Li$^+$] of the lithium salt is within the above range, since the electrolyte has appropriate conductivity and viscosity, excellent electrolyte performance can be obtained and lithium ions can be effectively transferred.

In addition, the polymer electrolyte of the present invention has excellent ion transference characteristics with the transference number of lithium cation of 0.5 or more. Also, an ion transference characteristic of the polymer electrolyte may be $10^{-5}$ to $10^{-3}$ S/cm.

Preparation Method of Polymer Electrolyte

Also, in order to prepare the polymer electrolyte as described above, the present invention provides a method of preparing the polymer electrolyte comprising the steps of (a) adding a sulfur compound, a nitrogen compound or a phosphorus compound to the poly(ethylene oxide) (PEO) containing polymer to modify a terminal of the poly(ethylene oxide) containing polymer; and (b) adding a lithium salt to the product of (a).

First, in step (a), the present invention modifies the terminal of the poly(ethylene oxide) (PEO)-based polymer by adding a sulfur compound, a nitrogen compound or a phosphorus compound to the poly(ethylene oxide)(PEO)-based polymer, and thus the terminal of the poly(ethylene oxide) polymer may be substituted with a sulfur compound functional group, a nitrogen compound functional group, or a phosphorus compound functional group.

Since the polymer electrolyte of the present invention has the sulfur compound, the nitrogen compound or the phosphorus compound introduced as a functional group at the terminal of the poly(ethylene oxide) polymer, ion conduction characteristics can be improved by inducing various interactions between the functional group introduced into the polymer and the lithium salt.

The method of adding the sulfur compound, nitrogen compound or phosphorus compound is not particularly limited, and a method commonly used in the art can be used. The sulfur compound may be thioglycolic acid, mercaptosuccinic acid, or thioglycerol.

Specifically, in the present invention, the nitrogen compound functional group introduced at the terminal of the poly(ethylene oxide) containing polymer may be nitrile, amine, pyridine, or imidazole etc., and the phosphorus compound functional group may be diethyl phosphonate, or phosphonic acid, etc.

In step (a), a specific example of the polymer in which the nitrogen compound or the phosphorus compound is introduced as a functional group at the terminal of the poly(ethylene oxide) polymer may be represented by any one of formulas 1 to 3 below:

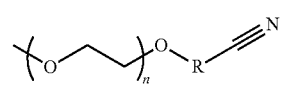

[Formula 1]

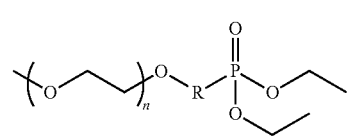

[Formula 2]

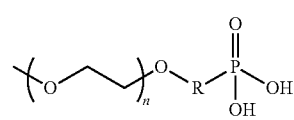

[Formula 3]

wherein n is a repeating unit of an integer of 10 to 120, and R is an alkyl chain having 1-4 carbon atoms.

Also, in the present invention, when the terminal of a poly(ethylene oxide) polymer is substituted with the sulfur compound functional group, the poly(ethylene oxide) polymer may be a block copolymer comprising a poly(ethylene oxide) block and a hydrophobic block, for example, a polystyrene block.

In that case, in the block copolymer containing a poly(ethylene oxide) block, the terminal of the poly(ethylene oxide) polymer can be replaced by a sulfur compound functional group by a method comprising the steps of modifying the terminal of the poly(ethylene oxide) block by the following formula (8); and subjecting the compound of formula (8) to a thiol-ene click reaction with the thiol compound of the following formula (9):

(8)

(9)

wherein $R_2$ is alkyl having 1 to 6 carbon atoms, and

R is a carboxyl group, a diol group, or a dicarboxyl group having 1 to 4 carbon atoms.

As described above, the polymer electrolyte of the present invention can reduce the crystallinity of the polymer to about 30 to 80% compared to that of non-substituted poly(ethylene oxide) (PEO), by synthesizing the polymer having various terminal functional groups introduced therein without changing the molecular weight of poly(ethylene oxide) (PEO).

Also, in step (b), the present invention intends to improve ion conductivity and lithium cation transference characteristics by introducing a lithium salt into the polymer modified in step (a) to prepare a composite electrolyte.

To this end, the present invention dope a poly(ethylene oxide)-based polymer with a lithium salt.

The lithium salt is not particularly limited, but preferably, may be at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, chloroborane lithium, lithium lower aliphatic carboxylate, lithium 4-phenylborate, imide, and bis(trifluoromethane sulfonyl)imide (LiTFSI).

Since the polymer electrolyte of the present invention can reduce the crystallinity of the polymer by synthesizing the polymer having various terminal functional groups introduced therein without changing the molecular weight of poly(ethylene oxide) (PEO), the molecular weight of the polymer electrolyte can be 1 to 20 kg/mol.

Also, in the polymer electrolyte of the present invention, [Li$^+$]/[EO] value, which is a ratio of [EO] in the polymer and [Li+] of the lithium salt, may be between 0.02 and 0.08 in order to ensure practical performance of the lithium battery. When the concentration of [EO] in the polymer and [Li$^+$] of the lithium salt is within the above range, since the electrolyte has appropriate conductivity and viscosity, excellent electrolyte performance can be obtained and lithium ions can be effectively transferred.

In addition, the polymer electrolyte of the present invention has excellent ion transference characteristics with a transference number of lithium cation of 0.5 or more.

All-Solid State Battery

Also, the present invention provides an all-solid state battery comprising a positive electrode, a negative electrode and a solid polymer electrolyte interposed therebetween, wherein the solid polymer electrolyte is a polymer electrolyte comprising a poly(ethylene oxide) (PEO)-based polymer and lithium salt and wherein the terminal of the poly(ethylene oxide) polymer is substituted with a sulfur compound functional group, a nitrogen compound functional group or a phosphorus compound functional group.

In the present invention, the electrode active material may be composed of a positive electrode active material when the electrode of the present invention is a positive electrode and may be composed of a negative electrode active material when the electrode proposed in the present invention is a negative electrode. In that case, each electrode active material can be any active material applied to conventional electrodes, and is not particularly limited in the present invention.

The positive electrode active material may vary depending on the use of the lithium secondary battery, and the specific composition is a known material. For example, any one lithium transition metal oxide selected from the group consisting of lithium-phosphate-iron-based compound, lithium cobalt-based oxide, lithium manganese-based oxide, lithium copper oxide, lithium nickel-based oxide and lithium manganese composite oxide, lithium-nickel-manganese-cobalt-based oxide may be mentioned. More specifically, among the lithium metal phosphates represented by Li$_{1+a}$M(PO$_{4-b}$)X$_b$, those wherein M is at least one selected from the metals of Groups 2 to 12, X is at least one selected from the group consisting of F, S and N, and preferably, $-0.5 \leq a \leq +0.5$ and $0 \leq b \leq 0.1$, are preferable.

In that case, the negative electrode active material may be one selected from the group consisting of lithium metal, a lithium alloy, a lithium metal composite oxide, a lithium-containing titanium composite oxide (LTO), and a combination thereof. At this time, the lithium alloy may be an alloy of lithium and at least one metal selected from Na, K, Rb, Cs, Fr, Be, Mg, Ca, Sr, Ba, Ra, Al and Sn. Also, the lithium metal composite oxide is composed of lithium (Li) and an oxide (MeOx) of any one metal (Me) selected from the group consisting of Si, Sn, Zn, Mg, Cd, Ce, Ni and Fe, and may be, for example, Li$_x$Fe$_2$O$_3$(0<x=1) or Li$_x$WO$_2$(0<x=1).

At this time, if necessary, in addition to the active material, a conducting material or a polymer electrolyte may be further added. Examples of the conducting material include nickel powder, cobalt oxide, titanium oxide, carbon, and the like. Examples of the carbon include any one selected from the group consisting of Ketjen black, acetylene black, furnace black, graphite, carbon fiber and fullerene, or at least one of them The all-solid state battery is manufactured by a dry compression process in which an electrode and a solid electrolyte are prepared in powder form, and then the resulting powders are put into a predetermined mold and then pressed, or is manufactured through a slurry coating process in which slurry composition including active material, solvent and binder is prepared, coated and dried. The manufacture of the all-solid state battery having the above-described configuration is not particularly limited in the present invention, and can be performed by a known method.

For example, a cell is assembled by placing a solid electrolyte between a positive electrode and a negative electrode, followed by compression molding. After the assembled cell is installed in the casing, it is sealed by heat compression or the like. Laminate packs made of aluminum, stainless steel, or the like, or cylindrical or square metal containers are very suitable for the exterior material.

A method of coating the electrode slurry on the current collector includes a method of dispensing the electrode slurry on the current collector and uniformly dispersing the electrode slurry using a doctor blade or the like, and methods such as die casting, comma coating, and screen printing. In addition, the electrode slurry may be bonded to the current collector by pressing or lamination after molding on a separate substrate. In that case, the thickness of the coating to be finally coated can be adjusted by adjusting the concentration of the slurry solution, the number of coatings, and the like.

The drying process is a process for removing the solvent and moisture in the slurry for drying the slurry coated on the metal current collector, and may be changed depending on the solvent used. For example, it is carried out in a vacuum oven at 50 to 200° C. Examples of the drying method include drying by warm air, hot air, or low-humidity air, vacuum drying, and drying by irradiation with (far)-infrared radiation or electron beam. The drying time is not particularly limited, but is usually in the range of 30 seconds to 24 hours.

After the drying process, a cooling process may be further included, and the cooling process may be a cooling process which slowly cool to room temperature so that a recrystallized structure of the binder is well formed.

In addition, if necessary, in order to increase the capacity density of the electrode and to increase the adhesion between the current collector and the active materials after the drying process, a rolling process in which the electrode is passed between two rolls heated at a high temperature and is compressed to a desired thickness can be performed. The rolling process is not particularly limited in the present invention, and a known rolling process is possible. For example, the rolling process is carried out by passing between rotating rolls or by using a flat press machine.

Hereinafter, the present invention will be described in detail with reference to Examples. However, the Examples according to the present invention can be modified into various other forms, and the scope of the present invention should not be construed as being limited to the Examples described below. The Examples of the present invention are provided to enable a person skilled in the art to more fully understand the present invention.

Example: Preparation of Terminal Substituted Poly(Ethylene Oxide)

Experimental Condition

Experimental Condition 1: Preparation of Salt-Doped Polymer

The calculated amount of LiTFSI was mixed with the polymer using methanol/benzene cosolvent and then stirred at room temperature for one day. The solvent is slowly evaporated to dryness in an argon environment, and then completely dried under vacuum for a week. In order to avoid water absorption by the sample, all sample preparation and drying procedures were performed in a glove box under an argon environment provided with oxygen and moisture sensor and vacuum oven.

Experimental Condition 2: Small Angle X-Ray Scattering (SAXS)

All synthesized polymer samples were subjected to Pohang Light Source (PLS) 4C and 9A beam lines. The wavelength ($\lambda$) of the incident X-ray is 0.118 nm ($\Delta\lambda/\lambda=10-4$). To prevent the samples from absorbing moisture during the measurement, sample cells were sealed by kapton film. We used 0.5 m and 1.5 m of sample-to-detector distances to cover the wide range of scattering wave vector q ($q=4\pi \sin(q/2)/\lambda$, q: scattering angle.

Experimental Condition 3: Differential Scanning Calorimetry (DSC)

The DSC thermograms of all synthesized polymer samples were measured using TA Instruments (model Q20). About 5 mg of sample was placed in an aluminum pan inside a glove box filled with argon, and an empty aluminum pan was used as a reference. Thermodynamic properties between −65° C. and 120° C. for temperature heating/cooling rate of 5° C./min and 10° C./min were measured.

Experimental Condition 4: Rheology

Dynamic storage modulus and loss modulus were measured using an Anton Paar MCR 302 rheometer. The rheometer was fitted with an 8 mm parallel plate and the sample was adjusted to 0.5 mm in thickness. All measurements were performed on a linear viscoelastic regime with a strain of 0.1%. The temperature heating/cooling experiments were carried out at a rate of 1° C./min while fixing the frequency at 0.5 rad/s, and experiments were conducted for frequencies of 0.1-100 rad/s at a temperature of 50° C.

Experimental Condition 5: Measurement of Conductivity

The salt-doped samples were measured for through-plane conductivity using a potentiostat (VersaSTAT 3, Princeton Applied Research) inside glove box under an argon environment. Home-built two electrode cells (consisting of a stainless steel blocking electrode and a 1 cm×1 cm platinum working/counter electrode) were used. The thickness of the sample was 200 μm.

Experimental Condition 6: Polarization Experiment

The salt-doped samples were placed between two lithium electrodes to conduct polarization experiments. The temperature of the sample was set to 60° C., and the polarization voltage ($\Delta V$) was obtained by observing the current flowing for 1 hour while maintaining 0.1V. All procedures were performed inside the glove box under an argon environment.

Experimental Condition 7: Fourier Transform Infrared Spectroscopy (FT-IR)

Infrared spectroscopy was performed using a Bruker Vertex 70 FT-IR spectrophotometer at a constant temperature of 22° C. Powder samples (high molecular weights) were measured 32 times in reflection mode, and averaged (frequency resolution 1 cm$^{-1}$), and liquid samples were measured 16 times in transmission mode and averaged (frequency resolution 4 cm$^{-1}$).

[Example 1]: Synthesis of Nitrile Substituted Poly(Ethylene Oxide) (Synthesis of PEO (CN))

Polyethylene glycol methyl ether (Mn=2000 g/mol, 4.0 g, 2.0 mmol) and acrylonitrile (20 mL) were stirred at 0° C. for 30 minutes and KOH (10 mg, 0.18 mmol) was added thereto. When the color of the reaction was changed to yellow, 5 mL of HCl was added to terminate the reaction.

The obtained reaction product was extracted with dichloromethane and the solvent was removed using a rotary evaporator. The obtained polymer was purified using ether. The NMR data of the prepared material was measured and shown in PEO-CN of FIG. 1.

$^1$H NMR (300 MHz, CDCl$_3$) δ ppm: 3.99-3.43 (n X 4H, —OCH$_2$CH$_2$O—), 3.37 (3H, —OCH$_3$), 2.59 (2H, —OCH$_2$CH$_2$CN),

[Example 2]: Synthesis of Diethyl Phosphonate Substituted Poly(Ethylene Oxide) (Synthesis of PEO (PE))

To a 50 mL round bottom flask (RBF), diethyl vinylphosphonate (2.5 mL, 16.3 mmol), and cesium carbonate (0.5 g, 1.5 mmol) were mixed under Ar condition and stirred at 90° C. for 30 min. Then, poly(ethylene glycol) methyl ether (Mw=2000 g/mol, 5 g, 2.5 mmol) was dissolved in 24 mL of acetonitrile. The polymer solution was added dropwise. After 3 days of reaction, HCl was added to terminate the reaction. The obtained reaction product was extracted with dichloromethane and the solvent was removed using a rotary evaporator. The obtained polymer was purified using ether. The NMR data of the prepared material was measured and shown in the PEO-PE of FIG. 1.

$^1$H NMR (300 MHz, D$_2$O) δ ppm: 4.15 (4H, —P=O (OCH$_2$CH$_3$)$_2$), 3.99-3.43 (n X 4H, —OCH$_2$CH$_2$O—), 3.37 (3H, —OCH$_3$), 2.26 (2H, —PCH$_2$CH$_2$O—), 1.33 (4H, —P=O(OCH$_2$CH$_3$)$_2$).

[Example 3]: Synthesis of Phosphonic Acid Substituted Poly(Ethylene Oxide) (Synthesis of PEO (PA))

Poly(ethylene glycol) methyl ether (1 g, 0.46 mmol), in which the terminal was substituted with phosphonate, was dissolved in 25 mL of chloroform and cooled to 0° C. Bromotrimethylsilane (0.1 mL, 0.75 mmol) is slowly added dropwise. After reaction at 40° C. for 15 hours, MeOH was added to terminate the reaction. After completion of the reaction, the solvent was removed using a rotary evaporator. The NMR data of the prepared material was measured and shown in the PEO-PA of FIG. 1.

$^1$H NMR (300 MHz, D$_2$O) δ ppm: 3.99-3.43 (n X 4H, —OCH$_2$CH$_2$O—), 3.37 (3H, —OCH$_3$), 1.99 (2H, —PCH$_2$CH$_2$O—).

[Comparative Example 1]: Synthesis of Poly(Ethylene Oxide)

Ethylene oxide monomer was purified twice by repeating stirring for one day in CaH$_2$ and 30 minutes in n-butyllithium. Methanol was purified by using magnesium and THF to be used as a solvent was purified by using benzophenone kethyl. Methanol (0.04 mL, 1 mmol) and t-Bu—P$_4$ (1 mL, 1 mmol) were added to 100 mL of the purified THF and degassed to make a vacuum state. The purified ethylene oxide (5 mL, 100 mmol) is distilled thereto, followed by reaction at room temperature for 3 days. The reaction is terminated by adding 0.1 mL of acetic acid. After completion of the reaction, purification was carried out using hexane.

The NMR data of the prepared material was measured and shown in the PEO of FIG. 1.

$^1$H NMR (300 MHz, D$_2$O) δ ppm: 3.99-3.43 (n X 4H, —OCH$_2$CH$_2$O—), 3.37 (3H, —OCH$_3$), 1.99.

[Comparative Example 2]: Synthesis of Two Hydroxyl Substituted Poly(Ethylene Oxide)

To a 250 mL round bottom flask, a solution of Poly (ethylene glycol) methyl ether (Mw=2000 g/mol, 5 g, 2.5 mmol) in 100 mL of anhydrous benzene was added and then sodium hydride (NaH, 0.5 g, 25 mmol) was added to the solution. The mixture was reacted at room temperature for 3 hours, then allyl bromide (15 g, 125 mmol) was added dropwise. After reacting for approximately a day, unreacted sodium hydride (NaH) was removed by filtration. The obtained reaction product was dried for 2 days and then the next reaction was carried out. The product (4 g, 2 mmol) was dissolved in 80 mL of anhydrous toluene, and thioglycerol (8.6 g, 80 mmol) and AIBN (1.3 mg, 8 mmol) were added, and then the reaction was carried out at 80° C. for 1.5 hours under an argon atmosphere. The solvent was removed from the reaction mixture using a rotary evaporator, and the residue was purified using ether.

Experimental Example 1: Result of NMR Measurement

As a result of 1H NMR measurement (AV300, using Bruker) of Examples 1 to 3 and Comparative Example 1 above, it was confirmed that the PEO-CN polymer of Example 1 with nitrile functional group has an extremely high substitution efficiency of 99% or more. The PEO-PE polymer of Example 2 with diethylphosphonate functional group had a high substitution efficiency of 87%, and in the case of the phosphonic acid functional group of Example 3 synthesized by hydrolysis it, it was confirmed that PEO-PA polymer with 100% hydrolysis efficiency was synthesized. In the case of this hydrolysis efficiency, it was confirmed that 100% phosphorus was also obtained by 31P NMR in FIG. 2.

Experimental Example 2: Result of GPC Measurement (Confirmation of the Presence or Absence of Cross-Link Formation)

In order to confirm the absence of the crosslinking of each of the synthesized polymers which are Examples 1 to 3 and Comparative Example 1, a gel permeation chromatography (GPC) (Waters Breeze 2 HPLC, Waters) was performed. As a result, polydispersity index (PDI) of Example 1 (PEO-CN), Example 2 (PEO-PA) and Example 3 (PEO-PE) polymers was confirmed to be 1.03, as shown in FIG. 3, and these values are the same as in Comparative Example 1 (PEO) used as a precursor. That is, it was confirmed that crosslinking was not formed in the substitution reaction of the terminal functional group.

Experimental Example 3: Result of DSC Measurement (Confirmation of the Effect of Functional Group on Crystallinity of Polymer)

Differential scanning calorimeter (DSC) analysis was performed to analyze the effect of functional groups on the crystallinity of the polymer. As a result, in the case of PEO—(OH)$_2$ in Comparative Example 2, in which two hydroxyl functional groups were introduced (see polymer used in our earlier patent, 10-2017-0029527) and the PEO-CN of Example 1 in which the nitrile functional group was introduced, a further reduction in crystallinity of about 9% relative to PEO in Comparative Example 1 was observed, as shown in FIG. 4 and Table 1. On the other hand, it can be seen that in the case of PEO-PE in Example 2 with diethylphosphonate functional group, the crystallinity was 53% relative to that of PEO, and Example 3, which form a phosphonic acid functional group by hydrolyzing it, has a crystallinity of only 42% relative to PEO. Through these, it can be seen that the introduction of the terminal functional group has a great influence on the crystallinity of PEO, and when using this, a method of improving the room temperature conductivity of a polymer electrolyte can be derived.

TABLE 1

|  | Sample | $T_m$ (° C.) | $\Delta H_m$ (J/g) | $T_c$ (° C.) | $\Delta H_c$ (J/g) | $T_g$ (° C.) |
| --- | --- | --- | --- | --- | --- | --- |
| Comparative Example 1 | PEO | 55.2 | 178.3 | 33.6 | 161.7 | −65 |
| Comparative Example 2 | PEO-(OH)$_2$ | 54.4 | 161.4 | 21.6 | 136.7 | −44 |
| Example 1 | PEO-CN | 54.1 | 156.9 | 28.7 | 145.8 | −19 |
| Example 2 | PEO-PE | 47.3 | 91.9 | 20.8 | 74.3 | −22 |
| Example 3 | PEO-PA | 53.2 | 78.8 | 18.4 | 66.5 | −33 |

Experimental Example 4: Result of Ion Conductivity Measurement

After doping with lithium salts (LiTFSI), ionic conductivity of synthesized polymers which are Example 1 (PEO-CN), Example 2 (PEO-PE), Example 3 (PEO-PA) and Comparative Example 1 (r=0.06) was measured using Potentiostat (VersaSTAT 3, Princeton Applied Research). As shown in FIG. 5, it can be seen that the conductivity of polymer of Example 3 (PEO-PA) with phosphonic acid terminal group was increased about 7 times at room temperature In addition, when the temperature of the x-axis is corrected to T0 (=Tg-50K) in consideration of the fact that the glass transition temperature (Tg) of the terminal substituted polymer is increased, it was found that the ion conduction efficiency of all terminal substituted polymers was greatly improved and thus end-group chemistry is a method for effectively increasing the ion transference efficiency of salt-doped polymers, as shown in FIG. 6.

Experimental Example 5: Results of Electrode Polarization Measurement

To analyze the effect of the interaction between the lithium salt and the functional group on the ion diffusion in the electrolyte, polarization experiments were performed at 46° C. for samples prepared by LiTFSI doping of synthesized polymers, which were Example 1 (PEO-CN), Example 3 (PEO-PA) and Comparative Example 1 (PEO). The potential difference of 0.1 V was applied between the two lithium electrodes to observe the change in current. The result is shown in FIG. 7. As a result, it can be confirmed that the PEO-CN of Example 1 and the PEO-PA of Example 3 have a higher final current value than a general PEO. These results were thought to be due to the fact that the nitrile and phosphonic acid functional groups present at the terminal of the polymer effectively dissociate lithium salts and act favorably on diffusion of lithium despite the slow relaxation of the polymer (Tg rise).

TABLE 2

|  | Sample | $I_{0.5}/I_0$ |
| --- | --- | --- |
| Comparative Example 1 | PEO | 0.442 |
| Example 1 | PEO-CN | 0.619 |
| Example 3 | PEO-PA | 0.522 |

Experimental Example 6: Result of Infrared Spectroscopy (FT-IR) Measurement

In order to analyze the cause of the decrease of crystallinity as in Experimental Example 3, the interaction between functional group and polymer and lithium salt was analyzed by a Fourier transform infrared spectroscopy (FT-IR). The results of the FT-IR measurements of Examples 1 to 3 and Comparative Example 1 are shown in FIGS. 8 to 10.

First, PA shows a stronger hydrogen bonding interaction between OH functional groups when compared with PEO, as shown in FIG. 8. This result is due to the fact that not only the absolute number of OH is about 1.7 times or more, but also the hydrogen bonding network between phosphonic acids is formed more efficiently.

Also, when comparing the characteristic peaks exhibited by the vibration (δ), wagging (ω), twisting (τ) and rocking (ρ) of the PEO chain in the spectrum between 1500 and 800 cm$^{-1}$ in FIG. 9, it can be seen that the intensities of PE and PA are always noticeably less than PEO and CN. This result is due to the decrease of crystallinity of PEO chain because of the introduction of diethylphosphonate functional group and phosphonic acid functional group. These results are in good agreement with the DSC results as described above.

Also, as quantified in FIG. 10, it was confirmed that in the case of PEO with phosphate groups, IR peaks are red-shifted by strong inter- and intra-hydrogen bonding between the terminal OH groups Also, in order to analyze the effect of lithium salt, the FT-IR spectra of polymer electrolytes formed by doping each of CN, PE, and PA polymers with LiTFSI salt in an amount of 2% were compared, as shown in FIGS. 11 to 13.

First, when the lithium salt is doped, the intensity of the peak at 2248 cm$^{-1}$ is reduced due to the formation of a new interaction of the nitrile functional group with the lithium salt, and at the same time, the peak of nitrile combined with Li cation is newly appeared at 2276 cm$^{-1}$, as shown in FIG. 11.

On the other hand, in the case of PA, as the phosphonic acid functional group forms a strong hydrogen bond with the TFSI anion, there is a phenomenon that the OH peak at about 3400 cm$^{-1}$ is shifted to about 3200 cm$^{-1}$, as shown in FIG. 12.

Also, FT-IR spectra for the polymer electrolytes formed by doping each of the polymers synthesized in Example 1 (PEO-CN), Example 2 (PEO-PE), Example 3 (PEO-PA) and Comparative Example 1 (PEO) with the LiTFSI salt in an amount of 2% are shown in FIG. 13. When comparing the 1354 and 1146 cm$^{-1}$ peaks attributable to the stretching (ν) of the TFSI anion O=S=O bond, the peak intensity for PA is much larger than those of other samples, and at the same time, the peak shift from 1146 cm$^{-1}$ to 1136 cm$^{-1}$ can be observed. This result also shows a strong hydrogen bonding interaction between PA and anion.

Experimental Example 7: Molecular Weight Analysis

All synthesized polymers were precipitated several times by ether, purified and then dried for one week at room temperature and vacuum. Nuclear Magnetic Resonance ($^1$H-NMR) experiments were performed and CDCl$_3$ and MeOD were used as internal standards. Gel permeation chromatography (GPC, Waters Breeze 2 HPLC) was used to analyze the molecular weight distribution of synthesized polymers on the basis of PS standard while using THF as the solvent. As a result, the molecular weights of the polymers prepared in Examples 1 to 3 and Comparative Examples 1 to 2 were within 1 to 20 kg/mol.

[Preparation Example 1]: Synthesis of Poly(Ethylene Oxide) in which Terminal was Substituted with Allyl Group (Synthesis of SEO-ene)

To a 50 mL round bottom flask, a solution of PS-b-PEO (200 mg, 0.014 mmol) in 4 mL of anhydrous benzene was added and then sodium hydride (NaH, 3.4 mg, 0.14 mmol) was added. The mixture was reacted at room temperature for 3 hours, then allyl bromide (87 mg, 0.72 mmol) was added dropwise. After reacting for approximately a day, unreacted sodium hydride (NaH) was removed by filtration.

$^1$H NMR (500 MHz, CDCl$_3$) δ ppm: 7.10-6.40 (b, n X 5H, CH$_2$CH(C$_6$H$_5$)), 5.95-5.87 (m, 1H, CH=CH$_2$), 5.29-5.16 (m, 2H, CH=CH$_2$), 4.0 (d, 2H, OCH$_2$CH=CH$_2$), 3.64 (b, n X 4H, —OCH$_2$CH$_2$O—), 2.21-1.20 (b, n XX 3H, CH$_2$CH (C$_6$H$_5$)).

[Example 4]: Synthesis of Poly(Ethylene Oxide) Substituted with Thioglycolic Acid (Synthesis of SEO-c)

To a 50 mL round bottom flask, SEO-ene (80 mg, 0.0057 mmol) prepared in Preparation Example 1, thioglycolic acid (10.57 mg, 0.1147 mmol), and AIBN (1.9 mg, 0.0114 mmol) were dissolved in 1.6 mL of anhydrous toluene under an argon atmosphere. The reaction was proceeded at 80° C. for 2.5 hours.

$^1$H NMR (500 MHz, CDCl$_3$) δ ppm: 7.10-6.30 (b, n X 5H, CH$_2$CH(C$_6$H$_5$)), 3.56 (b, n X 4H, —OCH$_2$CH$_2$O—), 3.23 (s, 2H, —SCH$_2$COOH), 2.78-2.75 (t, 2H, —CH$_2$SCH$_2$COOH), 2.21-1.20 (b, n XX 3H, CH$_2$CH (C$_6$H$_5$)).

[Example 5]: Synthesis of Poly(Ethylene Oxide) Substituted with Mercaptosuccinic Acid (Synthesis of SEO-2c)

To a 50 mL round bottom flask, SEO-ene (85 mg, 0.0061 mmol) prepared in Preparation Example 1, mercaptosuccinic acid (36.6 mg, 0.244 mmol), and AIBN (4 mg, 0.0244 mmol) were dissolved in 1.7 mL of anhydrous dioxane under an argon atmosphere. The reaction was proceeded at 80° C. for 1.5 hours.

$^1$H NMR (500 MHz, CDCl$_3$ and MeOD (5:1)) δ ppm: 7.10-6.30 (b, n X 5H, CH$_2$CH(C$_6$H$_5$)), 3.56 (b, n X 4H of —OCH$_2$CH$_2$O— and 1H of —C(H)COOH), 2.88-2.56 (m, 2H of —CH$_2$COOH and 2H of —CH$_2$S—), 2.20-1.20 (b, n XX 3H, CH$_2$CH(C$_6$H$_5$)).

[Example 6]: Synthesis of Poly(Ethylene Oxide) Substituted with Thioglycerol (Synthesis of SEO-2h)

To a 50 mL round bottom flask, SEO-ene (85 mg, 0.0061 mmol) prepared in Preparation Example 1, thioglycerol (26.4 mg, 0.244 mmol), and AIBN (4 mg, 0.0244 mmol) were dissolved in 1.7 mL of anhydrous toluene under an argon atmosphere. The reaction was proceeded at 80° C. for 1.5 hours.

$^1$H NMR (500 MHz, CDCl$_3$) δ ppm: 7.10-6.30 (b, n X 5H, CH$_2$CH(C$_6$H$_5$)), 3.64 (b, n X 4H of —OCH$_2$CH$_2$O— and 3H of thioglycerol), 2.66-2.63 (m, 4H, —CH$_2$SCH$_2$—), 2.20-1.20 (b, n XX 3H, CH$_2$CH(C$_6$H$_5$))

Experimental Example 8: Synthesis of Terminal Substituted PS-b-PEO Block Copolymer As in Examples 4 to 6, PS-b-PEO block copolymers substituted with different kinds and numbers of terminals were synthesized. As shown in FIG. 14, PS-b-PEO (7.4-6.5 kg/mol) in which the terminal of PEO was the —OH group was first substituted with allyl bromide group under sodium hydride (NaH). Then, different terminal groups can be introduced through the thiol-ene coupling reaction using a thiolating agent (thioglycolic acid, mercaptosuccinic acid, thioglycerol). Hydroxyl, allyl, carboxylic acid, diol, and dicarboxylic acid functionalized SEO were named as SEO-h, SEO-ene, SEO-c, SEO-2h and SEO-2c, respectively. PEO-h, PEO-ene, PEO-c PEO-2h and PEO-2c were synthesized from PEO homopolymer (5.0 kg/mol). All samples with terminal substitution for PEO had an increase in molecular weight of less than 0.19 kg/mol.

FIG. 15a shows the 1H-NMR spectra of SEO-ene, SEO-c, SEO-2h and SEO-2c. From the fact that peaks at 5.94-5.88 ppm and 5.29-5.16 ppm disappeared in the spectra and new peaks at 3.30-2.50 ppm were generated, it was confirmed that SEO-c, SEO-2h, and SEO-2c were successfully synthesized. Based on the NMR data, it was confirmed that the degrees of terminal substitution were all 95% or more. It was confirmed through Gel Permeation Chromatography (GPC) of FIG. 15b that no side reaction or cross linking was occurred Referring to the FT-IR spectrum in FIG. 15c, it can be seen that the O—H stretching peak appearing between 3700-3100 cm$^{-1}$ is approximately proportional to the number of terminal groups. In addition, it can be seen that the C=O peaks at 1750-1700 cm-1 in SEO-c and SEO-2c spectra are related to the number of terminal —COOH groups. The terminal substitution FT-IR analysis was further discussed in the analysis of intermolecular interactions.

Experimental Example 9: Morphology and Viscoelastic Analysis of SEO Block Copolymer with Terminal Substitution Next, the morphology of SEO block copolymers with terminal substitution was reviewed. FIG. 16 shows SAXS data of the prepared samples at 60° C. SEO-h samples with one —OH showed only one bragg peak at q*=0.363 nm-1. The SEO-c sample with —COOH at the terminal showed a bragg peak of 1q*:2q* at similar q* (domain spacing, $d_{100}$=17.3 nm). These results indicate the formation of ordered lamellar morphology. When comparing with SEO-h, it can be seen that the scattering intensity increases markedly at low q values, which is considered to be the effect of the formation of the structure by the introduction of —COOH at the terminal.

When attaching two terminals to the PEO chain of SEO, it was observed that both SEO-2h and SEO-2c exhibited $\sqrt{6}_{q*}$, $\sqrt{8}_{q*}$, $\sqrt{14}_{q*}$, $\sqrt{16}_{q*}$, $\sqrt{20}_{q*}$, and $\sqrt{22}_{q*}$ bragg peaks, which means a well-ordered gyroid morphology. Domain spacing ($d_{211}$) showed a noticeable increase as 18.4 nm for SEO-2h and 18.8 nm for SEO-2c, which is thought to be the result of increased free volume by the terminal diol, dicarboxylic acid. Overall, it can be interpreted from this result that when the terminal functional group is introduced into the PEO chain, the crystallinity decreases and the free volume increases. The density of crystalline PEO was 1.21 g/cm$^3$ whereas the density of amorphous PEO was 1.12 g/cm$^3$.

Referring to the DSC data inserted in FIG. 16, terminal introduced SEO samples (SEO-c, SEO-2c, SEO-2h) showed lower melting energy (ΔHm) than SEO-h. The crystallinity which was calculated for the crystallinity at the time of melting energy (ΔHm)=215.6 J/g (PEO homopolymer) to be 100% was 60.3%, 36.0%, 27.9% and 31.8% for SEO-h, SEO-c, SEO-2h and SEO-2c, respectively. Since the concentration of the group introduced into the terminal is less than 1 mol %, it is a very interesting result to show such reduction in crystallinity.

The introduction of a terminal group into SEO also has an important effect on linear viscoelastic property. FIG. 17a shows the results of storage (G') and loss (G") moduli measured while cooling the terminal substituted samples at a rate of 1° C./min from 80° C. The observed history shows different crystallization behavior when the PEO chain end is substituted. When comparing the modulus obtained by repeated heating and cooling, it was observed that when the terminal group is introduced, the modulus of the steady state (indicated by the dotted line) is increased considerably. (G'=17 MPa (SEO-h), 35 MPa (SEO-c), 122 MPa (SEO-2h), and 121 MPa (SEO-2c). In the case of SEO-2h and SEO-2c, it can be seen that the highest modulus was shown due to the advantages of gyroid morphology with cubic symmetry. On the other hand, in the case of PEO homopolymer, the modulus was decreased regardless of the terminal group. In conclusion, it can be concluded that the number of terminal groups has a significant impact on the mechanical strength of SEO.

FIG. 17b directly compares the modulus and viscoelastic properties of SEO-2c and PEO-2c. As a result of observing while changing the frequency at a specific temperature (323K), PEO-2c showed a typical viscoelastic solid (G'(w) ~G"(w)~w$^{1/4}$). At the same temperature, SEO-2c showed higher modulus than PEO-2c by more than 10$^3$ times and was less dependent on frequency (G' (w)~w$^{0.12}$, G" (w)~w$^{0.03}$). This result shows that the characteristic of the elastic behavior is due to the characteristic of the cube and the glassy state of the PS block.

Ion Conduction Characteristics of Terminal Functional Group Introduced Polymer Electrolyte Membrane Next, the terminal group substituted samples were doped with lithium salt to investigate ion conduction characteristics. FIG. 18a shows the results of measurement of ion conduction characteristics of samples doped with r=0.02 (r=[Li$^+$]/[EO]) salt depending on the temperature using AC impedance spectroscopy. Referring to the result, it was clearly observed that when the terminal is substituted, the conductivity at room temperature is much improved, and the carboxylic acid introduced material most significantly lowered the crystallinity of PEO. All samples showed similar ion conduction characteristics when the temperature was raised. When a terminal group is introduced, the fact that the conductivity is improved can be a very interesting result, despite the increase in glass transition temperatures to −65° C. (SEO-h), −45° C. (SEO-c), −44° C. (SEO-2h) and −37° C. (SEO-2c). In particular, when considering that SEO-2h and SEO-2c have a modulus that is 3 to 7 times stronger than SEO-h, it is considered a remarkable result. When lithium salt is doped with r=0.02, the morphologies of SEO-c, SEO-2h, and SEO-2c were maintained, and SEO-h has a lamellar morphology due to the increase in segregation strength between PS and PEO including salt.

All samples showed results that converged to similar conductivity at high temperature. However, when having diol group, it was observed that the lithium transference number ($T_{Li}^+$) was significantly improved. FIG. 18b shows the $T_{Li}^+$ value at 60° C. The samples doped with lithium salt with r=0.02 were analyzed by polarization experiment. The polarization voltage (ΔV) was applied between two lithium electrodes and current was measured while maintaining 0.1V. SEO-h showed a $T_{Li}^+$ value of 0.25, which is consistent with the values of typical PEO and lithium salt composite electrolyte membranes as reported in the literature. The introduction of carboxylic acid to the terminal group did not improve $T_{Li}^+$, but when the diol group was introduced, $T_{Li}^+$ was nearly doubled (0.48). FIG. 18(b) shows the results of polarization experiments of samples in which —OH and —(OH)$_2$ were introduced into the terminal. The mechanism of such a result will be discussed in the next chapter.

FIG. 18c shows the conduction characteristics when the salt was doped with r=0.06, and all the lamellar morphology was shown regardless of the terminal group. It was confirmed through DSC data that all samples were amorphous. The sample with carboxylic acid as the terminal showed the lowest conduction characteristic, which is believed to be due to the slow segmental motion due to the internal dipole-dipole interactions. It is notable that SEO-2h shows higher conductivity than SEO-h at high temperature. Even if the salt concentration was increased, when having diol group, the value of $T_{Li}^+$ was improved by about two times, which is a very high value since other samples show values of ~0.2. The potential barrier obtained by fitting the conductivity data by the Vogel-Tammann-Fulcher (VTF) equation is 974 K, 1181 K, 1380 K, and 1227 K for SEO-h, SEO-c, SEO-2h and SEO-2c.

Inter- and Intramolecular Interaction by Terminal Group on PEO

FT-IR spectroscopy for inter- and intramolecular interactions in PEO for in-depth research was performed. To emphasize the signal in the terminal group, samples were prepared by replacing the terminal group of PEO (0.55 kg/mol) with low molecular weight. This increased the end group concentration to 8 mol %. The synthesized polymers were liquid phase, and the synthesized polymers were filled in CaF$_2$ window and observed by FT-IR spectrum. The C—H stretching peak at around 2900 cm$^{-1}$ was used as the internal standard.

First, to examine the effect of number and type of terminal groups, PEO samples not doped with lithium salt were analyzed. FIG. 19a shows the FT-IR spectra obtained at 22° C. and the range of 3700-2600 cm$^{-1}$. When comparing the spectra of PEO-h and PEO-2h, red-shift (41 cm-1) was observed, and the intensity of the band was increased by OH stretching. This is thought to be due to intra-chain hydrogen bond because the degree of shift is usually smaller than the band of hydrogen bonds seen in the inter-chain. This result implies that even when simply increasing the number of —OH end groups, the chain shape can be dramatically changed. These changes eventually play an important role in the crystallinity of PEO, which can be confirmed by DSC and rheology measurements.

PEO-c and PEO-2c samples also showed peaks due to OH stretching. However, a very broad, low-intensity peak was observed in the region of 3000-3700 cm$^{-1}$, which means that the carboxylic acid at the terminal is actively hydrogen-bonding to the ether oxygen in the chain.

It is notable that the C=O stretching peaks at 1850-1600 cm$^{-1}$ for PEO-c and PEO-2c are significantly different to each other. PEO-c showed three peaks, while PEO-2c showed one peak. This difference means that the —COOH groups of the terminal of PEO-c are adjacent to each other and form a dimer by hydrogen bond and quadrupole interactions. In contrast, in the case of PEO-2c, the interactions as mentioned above did not occur well due to steric hindrance.

In the presence of lithium salt, it was observed that hydrogen bonding interaction between the TFSI-anion and the PEO terminal group simultaneously with C—O—C vibration were occurred. These interactions were more prominent when hydroxyl groups were introduced. FIG. 19d shows the data of PEO-2h, and a broad and red-shifted band due to OH stretching can be observed. When the background is removed using the PEO-2h spectrum, changes by OH stretching can be observed at 3332 cm$^{-1}$ and 3542 cm$^{-1}$. These results are due to the hydrogen bonding between the OH group and the TFSI-anion and also due to the coordination between the OH group and the lithium ion. Blue shifting while coordinating with lithium ions was in good agreement with the results expected by using the Ab Intio calculation using the density functional theory based on the B3LYP exchange-correlation functional.

Through these results, it is possible to explain that SEO with a diol group at the terminal shows high $T_{Li}^+$ because it has the effect of stabilizing the anion by the hydrogen bond between terminal and anion. These results led us to conclude that increasing the number of terminal groups is an effective way to increase the conduction characteristics and the lithium transference number.

In the case of PEO-c and PEO-2c doped with lithium salt, a new peak due to the C=O stretching was observed in the low frequency region, which means that —COOH group of the terminal interacts via the lithium ion. Therefore, when the terminal is —COOH, it is explained that the lithium ion is bound by interaction with the terminal and shows low conduction characteristic. (FIG. 18c).

FIG. 20a shows a schematic view of PEO-h having crystallinity and PEO-c forming a dimer and PEO-2h having intramolecular hydrogen bond. In the presence of lithium (FIG. 20b), the lithium ion is primarily coordinated with ether oxygen in the PEO main chain, and the terminal group and the anion of the lithium salt forms a hydrogen bond. The sample with the diol group as a terminal did not quadrupole interactions and thus showed higher conduction characteristics and lithium transference number than the samples with the dicarboxylic acid as a terminal.

Studies to adjust the self-assembly, linear viscoelastic property and ion conduction property of the PS-b-PEO block copolymer through the terminal group were carried out. Two important results of these studies are summarized as follows: First, when introducing several groups into the PEO terminal of the PE-b-PEO block copolymer, it is possible to increase the free volume of the PEO and change the chain conformation of the PEO to obtain a co-continuous or amorphous PEO phase. These changes had a profound effect on the room temperature conductivity (~30-fold increase) and linear viscoelastic property (3 to 7-fold increase). Especially, when the diol group was used as a terminal, high ion conduction efficiency was observed over the full operating temperature range, which is considered to be useful as a dry polymer electrolyte membrane. Second, the lithium transference number was greatly improved while hydrogen-bonding with the anion of the lithium salt regardless of the terminal group. The method of controlling the density of the terminal group proposed in this study can solve the low lithium transference number which is a fundamental disadvantage of electrolyte membrane doped with salt in PEO, and through this, is expected to be used in the manufacture of a solid polymer electrolyte membrane and thus contribute to the development of the next generation energy storage device.

The invention claimed is:

1. A polymer electrolyte comprising:
a poly(ethylene oxide) containing polymer; and
a lithium salt,
wherein the poly(ethylene oxide) containing polymer is represented by formula 2 or formula 3 below:

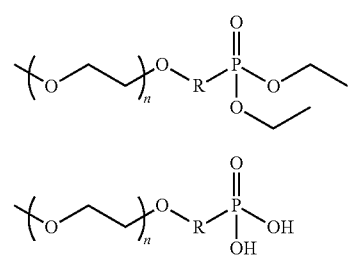

[Formula 2]

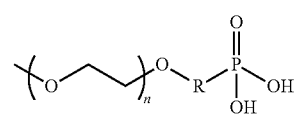

[Formula 3]

wherein n is a repeating unit of an integer of 10 to 120, and R is an alkyl chain having 1-4 carbon atoms.

2. The polymer electrolyte according to claim 1, wherein the poly(ethylene oxide) containing polymer is represented by formula 2 below:

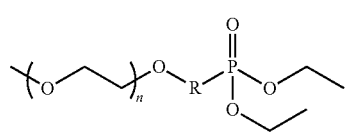

[Formula 2]

wherein n is a repeating unit of an integer of 10 to 120, and R is an alkyl chain having 1-4 carbon atoms.

3. The polymer electrolyte according to claim 1, wherein the poly(ethylene oxide) containing polymer is represented by formula 3 below:

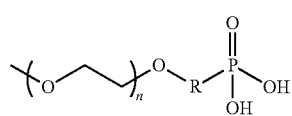

[Formula 3]

wherein n is a repeating unit of an integer of 10 to 120, and R is an alkyl chain having 1-4 carbon atoms.

4. The polymer electrolyte according to claim 1, wherein the lithium salt is at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, chloroborane lithium, lithium lower aliphatic carboxylate, lithium 4-phenylborate, imide, and bis(trifluoromethane sulfonyl)imide (LiTFSI).

5. The polymer electrolyte according to claim 1, wherein the poly(ethylene oxide) containing polymer has a molecular weight in the range of 1-20 kg/mol.

6. The polymer electrolyte according to claim 1, wherein in the polymer electrolyte, ethylene oxide (EO) of the poly(ethylene oxide) containing polymer and lithium ($Li^+$) of the lithium salt are present in a ratio of concentration of [$Li^+$]/[EO] between 0.02 and 0.08.

7. The polymer electrolyte according to claim 1, wherein an ion transference characteristic of the polymer electrolyte is $10^{-5}$ to $10^{-3}$ S/cm.

8. The polymer electrolyte according to claim 1, wherein the polymer electrolyte is a solid electrolyte for an all-solid state battery.

9. A method of preparing the polymer electrolyte according to claim 1, comprising the steps of:
(a) adding a phosphorus compound to a poly(ethylene oxide) containing polymer to modify a terminal of the poly(ethylene oxide) containing polymer; and
(b) adding a lithium salt to the product of (a),
wherein the poly(ethylene oxide) containing polymer is represented by formula 2 or formula 3 below:

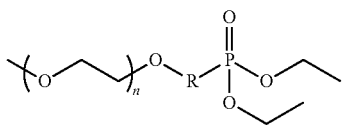

[Formula 2]

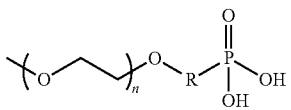

[Formula 3]

wherein n is a repeating unit of an integer of 10 to 120, and R is an alkyl chain having 1-4 carbon atoms.

10. The method of preparing the polymer electrolyte according to claim 9, wherein in step (a), the phosphorus compound is added, wherein the phosphorus compound is a diethyl phosphonate compound or a phosphonic acid compound.

11. An all-solid state battery comprising:
a positive electrode,
a negative electrode and
a solid polymer electrolyte interposed therebetween, wherein the solid polymer electrolyte is the polymer electrolyte of claim 1.

* * * * *